(12) United States Patent
Constantinescu

(10) Patent No.: US 6,729,610 B2
(45) Date of Patent: *May 4, 2004

(54) ELEVATED COMPOSITE MATERIAL SPRINGS WITH ATTACHMENT FITTINGS

(75) Inventor: Eugene Constantinescu, Greensboro, NC (US)

(73) Assignee: Sealy Technology LLC, Trinity, NC (US)

( * ) Notice: Subject to any disclaimer, the term of this patent is extended or adjusted under 35 U.S.C. 154(b) by 23 days.

This patent is subject to a terminal disclaimer.

(21) Appl. No.: 10/051,979

(22) Filed: Jan. 17, 2002

(65) Prior Publication Data

US 2002/0100119 A1 Aug. 1, 2002

Related U.S. Application Data

(63) Continuation-in-part of application No. 09/614,429, filed on Jul. 12, 2000, now Pat. No. 6,406,009, which is a continuation-in-part of application No. 09/260,823, filed on Mar. 2, 1999, now Pat. No. 6,354,577, which is a continuation of application No. 08/843,927, filed on Apr. 17, 1997, now abandoned, which is a continuation-in-part of application No. 08/487,022, filed on Jun. 7, 1995, now Pat. No. 5,720,471.

(51) Int. Cl.[7] .................................................. F16F 3/93
(52) U.S. Cl. ....................................................... 267/81
(58) Field of Search .............................. 267/81, 95, 96, 267/103, 106, 107, 109, 110, 111, 143, 151, 104; 5/255, 247, 690

(56) References Cited

U.S. PATENT DOCUMENTS

| 488,378 A | 12/1892 | Bell |
|---|---|---|
| 323,224 A | 12/1929 | Johnson |
| 2,239,062 A | 4/1941 | Tallmadge |
| 2,242,731 A | 5/1941 | Tallmadge |
| 2,503,333 A | 4/1950 | Gyles |
| 2,979,739 A | 4/1961 | Krakauer |
| 3,773,310 A | 11/1973 | Crosby |
| 4,245,362 A | 1/1981 | Mueller |
| 4,251,892 A | 2/1981 | Hancock |
| 4,411,159 A | 10/1983 | Spear et al. |
| 4,519,591 A | 5/1985 | Bush et al. |
| 4,530,490 A | 7/1985 | Misumi et al. |
| 4,736,932 A | 4/1988 | Haslim |
| 5,054,751 A | 10/1991 | Brown |
| 5,165,125 A | 11/1992 | Callaway |
| 5,265,291 A | 11/1993 | Callaway |
| 5,407,344 A | 4/1995 | Rombalski, Jr. et al. |
| 5,426,799 A | 6/1995 | Ottiger et al. |
| 5,499,410 A | 3/1996 | Assink |
| 5,622,357 A | 4/1997 | Schulz, Jr. et al. |
| 5,720,471 A | 2/1998 | Constantinescu et al. |
| 6,134,729 A | 10/2000 | Quintile et al. |
| 6,354,577 B1 * | 3/2002 | Quintile et al. ............. 267/149 |
| 6,406,009 B1 * | 6/2002 | Constantinescu et al. ..... 267/81 |

FOREIGN PATENT DOCUMENTS

ES 494839 A1 * 7/1992

* cited by examiner

Primary Examiner—Jack Lavinder
Assistant Examiner—Xuan Lan Nguyen
(74) Attorney, Agent, or Firm—Roetzel & Andress

(57) ABSTRACT

Composite material springs with integrals spacers for located between a frame attachment fitting and a spring body provide springs with an increased vertical profile for support structures with greater height. Spring elements are formed with encapsulated fibers. Attachment fittings and other structural elements such as the spacers are integrally formed by molding about the spring elements, in any suitable form for integration and assembly with spring support structure assemblies, such as a support frame on which the composite material springs are mounted, and a support structure such as a grid or wire work to which the springs are attached by the various types of attachment fittings. Direct mounting of springs to surfaces of frame members is also disclosed.

48 Claims, 23 Drawing Sheets

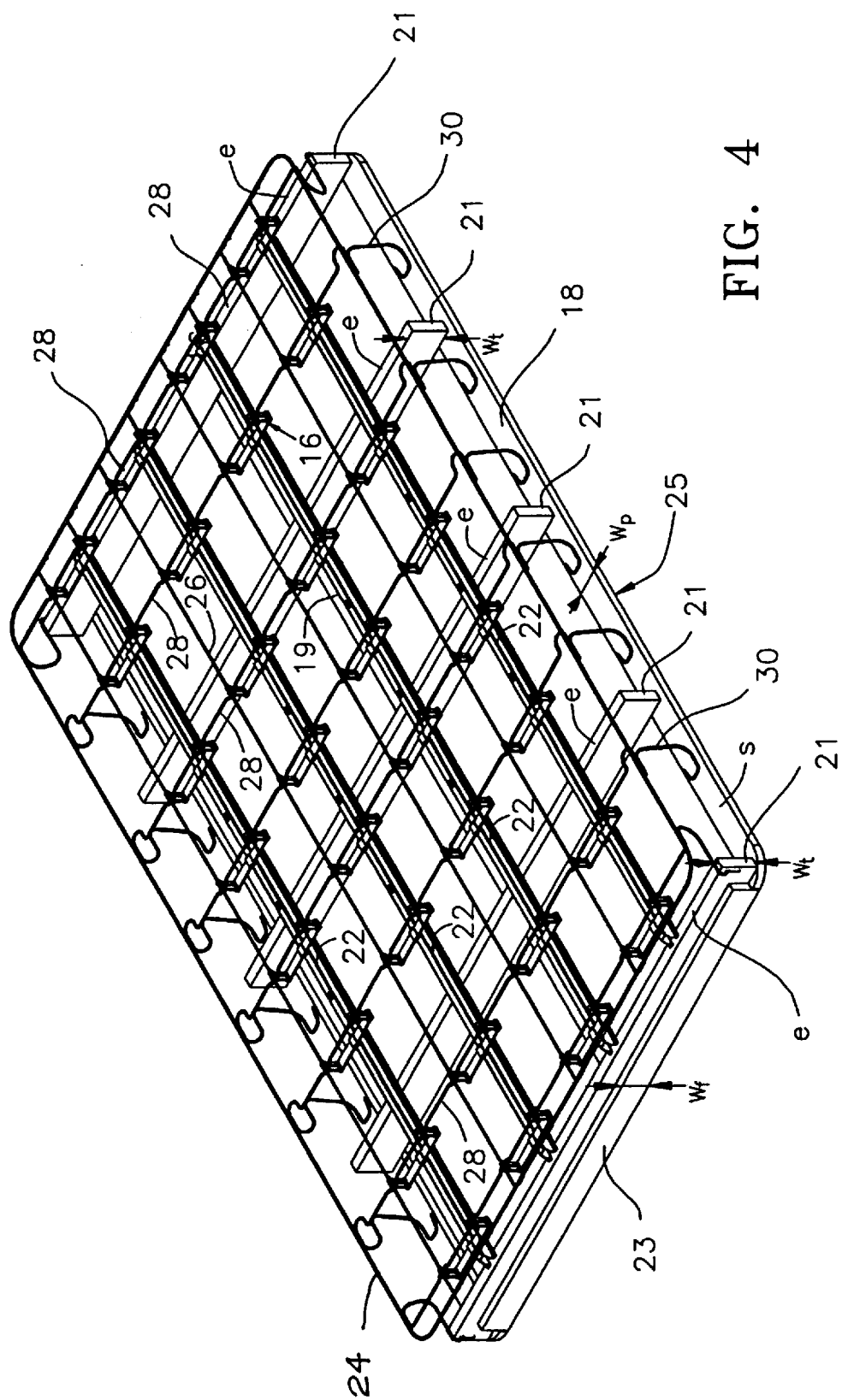

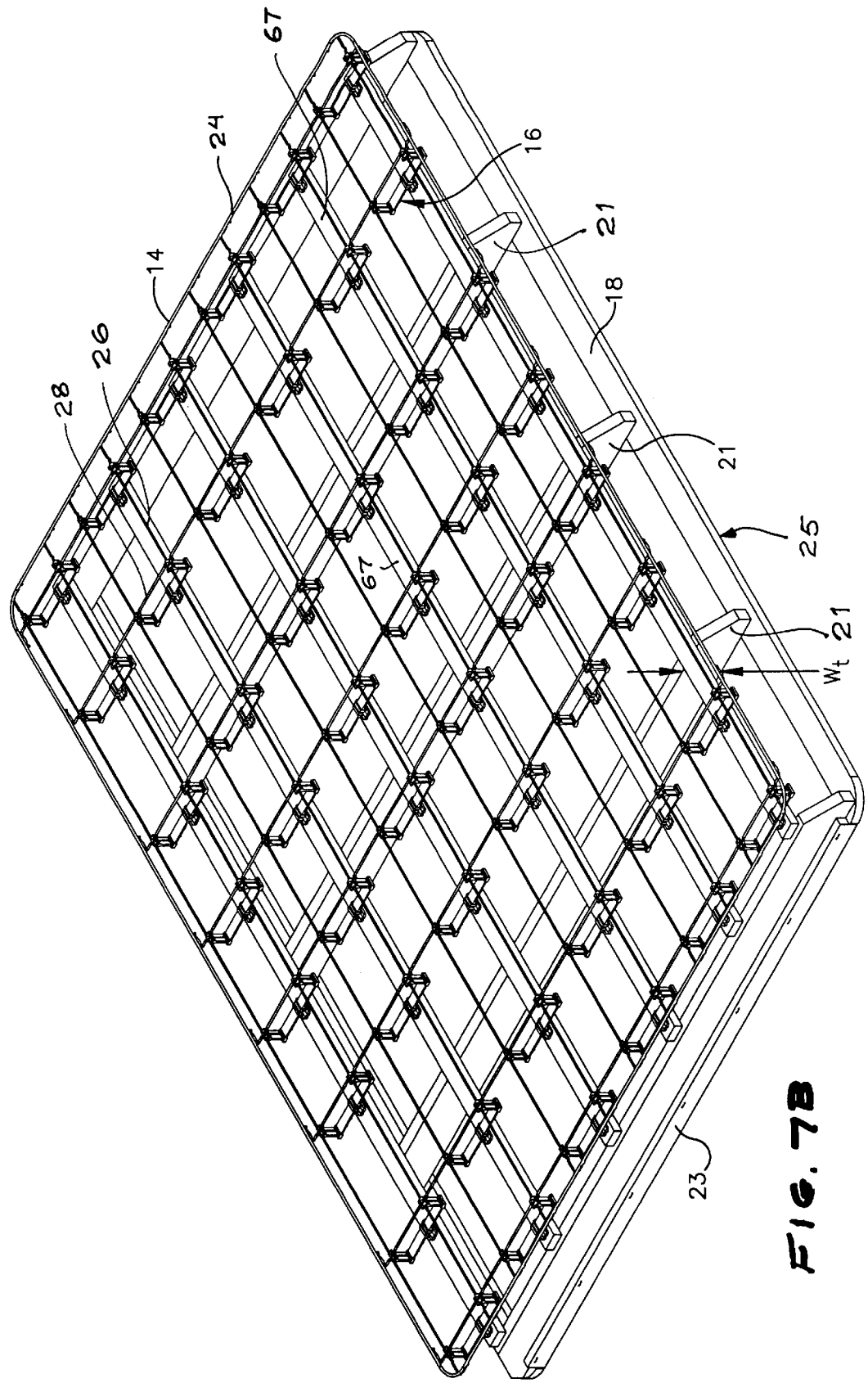

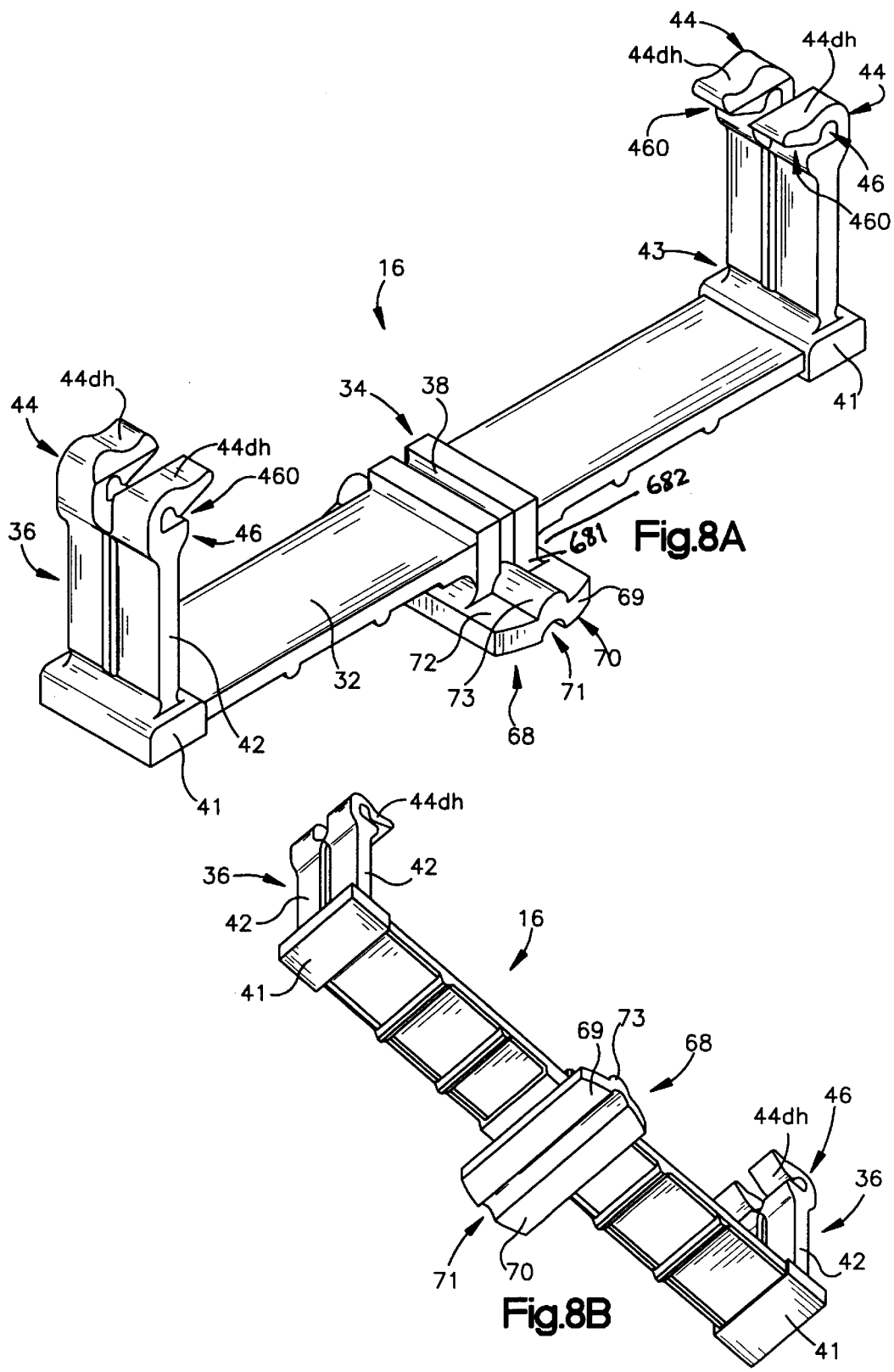

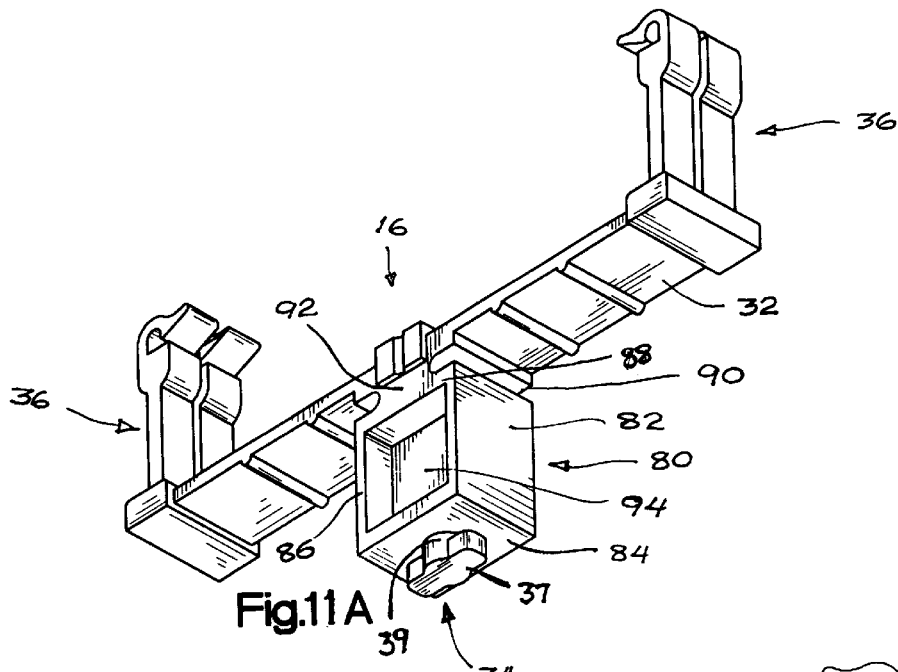
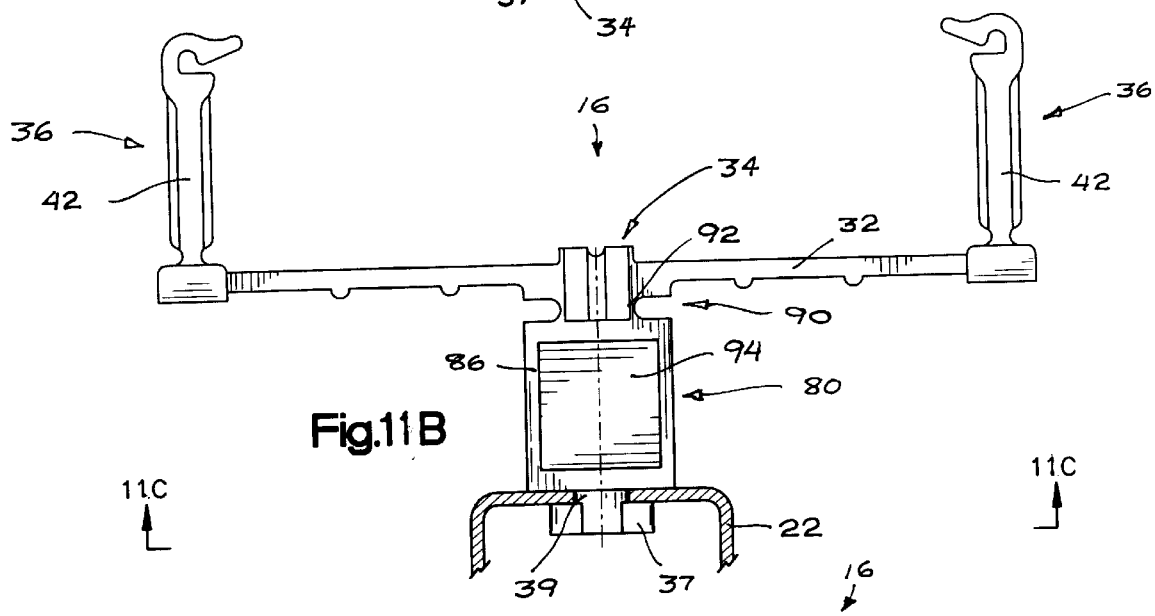
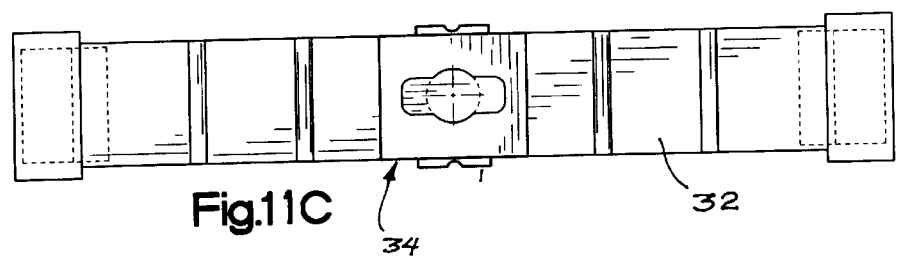

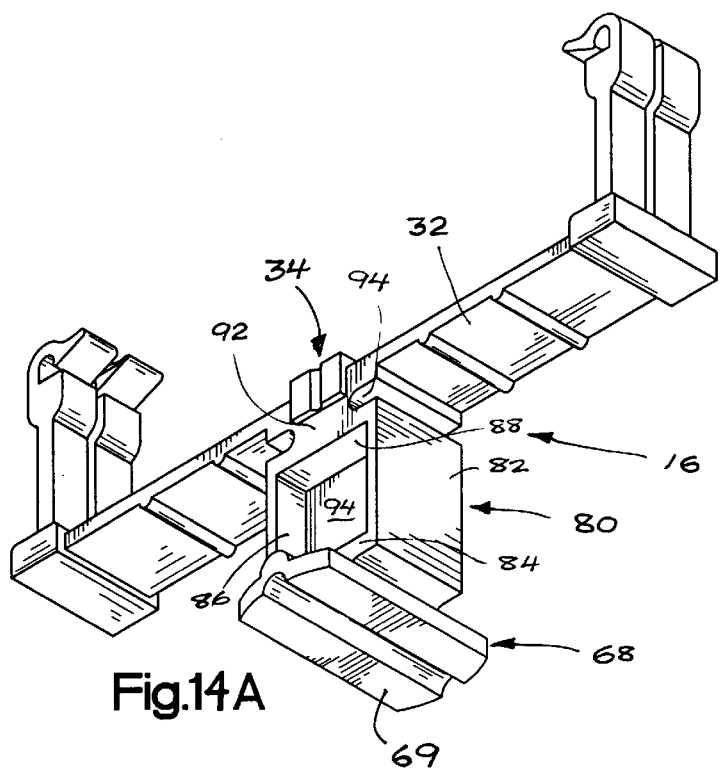
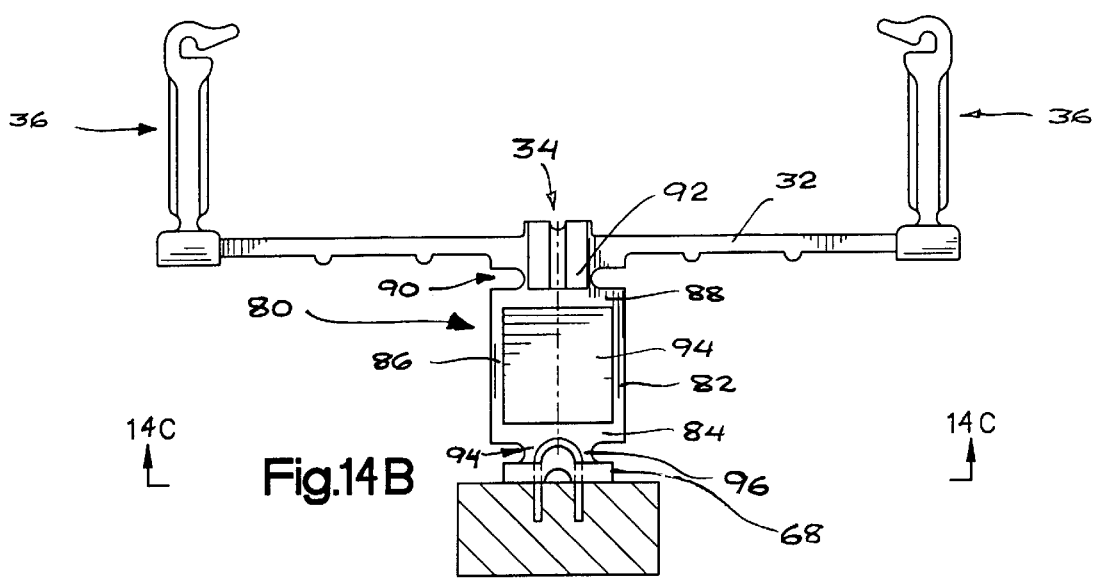
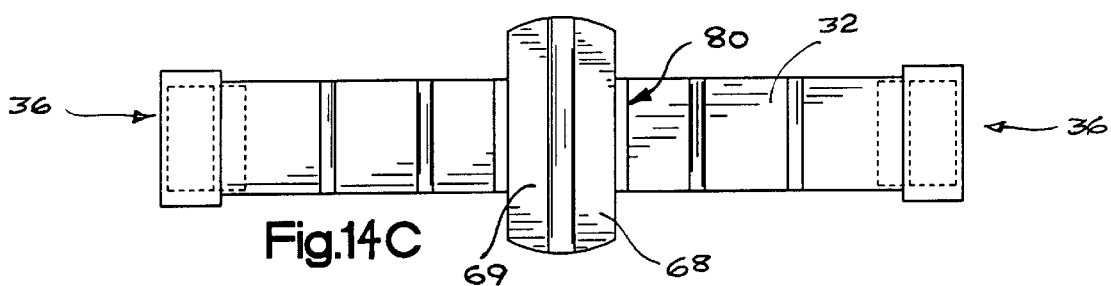

ELEVATED COMPOSITE MATERIAL SPRINGS WITH ATTACHMENT FITTINGS

This application is a continuation in part of application Ser. No. 06/614,429 filed Jul. 12, 2000 U.S. Pat. No. 6,406,009, which is a continuation-in-part of application Ser. No. 09/260,823, filed Mar. 2, 1999, now U.S. Pat. No. 6,354,577, which is a continuation of application Ser. No. 08/843,927 filed Apr. 17, 1999 ABN, which is a continuation-in-part of application Ser. No. 08/487,022 filed Jun. 7, 1995, now U.S. Pat. No. 5,720,471.

FIELD OF THE INVENTION

The present invention pertains generally to plastic composite material springs for use as flexible elements in weight bearing structures, and more particularly for use in flexible weight bearing structures such as bedding and seating and furniture.

BACKGROUND OF THE INVENTION

Springs for use as flexible support elements in support structures such as seating and bedding and furniture have traditionally and conventionally been constructed of spring steel and wire. See, for example, U.S. Pat. Nos. 188,636; 488,378; 1,887,058; 4,535,978; 4,339,834; 5,558,315. Attempts have been made to construct spring support elements out of plastic material. See, for example U.S. Pat. Nos. 4,530,490; 4,736,932; 5,165,125 and 5,265,291. Although fiber reinforced plastic springs are fairly well-developed, the use thereof in flexible support structures such as seating, furniture and bedding presents the formidable engineering challenge of providing suitable means for attachment of the springs to a frame structure and an overlying support surface. Plastic springs have heretofore been simply mechanically attached to a supporting structure such as described in U.S. Pat. No. 4,411,159 on a fiber reinforced plastic leaf spring for a vehicle. Any type of mechanical attachment is complicated by the extreme hardness and stiffness of fiber reinforced plastics.

Ultimately it is nearly always necessary to drill attachment holes in the spring for a mechanical fastener (such as described in U.S. Pat. No. 4,736,932) requiring additional manufacturing and assembly steps. Also, drilling through the fiber-reinforced structure breaks the preferred long strand/roving fibers which are critical to providing optimal spring characteristics. The related application discloses clips for attachment of mattress foundation springs to a frame and an overlying grid. Although fully operative and novel, this approach requires additional parts and increased assembly tasks, and does not entirely overcome the negatives of possible slippage between the spring and the clips, and noise generation by such relative motion.

Conventional bedding systems commonly include a mattress supported by a foundation or "box spring." Foundations are provided to give support and firmness to the mattress as well as resilience in order to deflect under excessive or shock load. Foundations are typically composed of a rectangular wooden frame, a steel wire grid supported above the wooden frame by an array of steel wire springs such as compression type springs which are secured to the wooden frame. In order to properly support and maintain the firmness level in the mattress, a large number of compression springs are needed in the foundation, resulting in high production cost. This is the main disadvantage of using compression springs in mattress foundations. Also, foundations which use compression springs typically have a low carbon wire grid or matrix attached to the tops of the springs. Both the wires and the welds of the matrix can be bent or broken under abusive conditions. In such steel/metal systems, fasteners are required to secure the springs to the grid and to the frame. This leads to metal-to-metal contact which can easily produce squeaking sounds under dynamic loading.

In an effort to avoid the high cost of using compression springs in foundations, another type of spring used is the torsional steel spring formed from heavy gauge steel spring wire bent into multiple continuous sections which deflect by torsion when compressed. See for example U.S. Pat. Nos. 4,932,535; 5,346,190 and 5,558,315. Because torsional springs are dimensionally larger and stiffer than compression springs, fewer torsional springs are needed in the foundation. However, the manufacture of torsional-type springs from steel wire requires very expensive tooling and bending equipment. Elaborate progressive bending dies are required to produce the complex torsional spring module shapes which may include four or more adjoining sections. The manufacturing process is not economically adaptable to produce different spring configurations without new tooling, tooling reworking and/or machinery set-up changes and process disruption, etc. Therefore, the configuration and resultant spring rate of such springs cannot be easily or inexpensively altered to produce foundations with different support characteristics. Furthermore, the many bends in these types of springs make dimensional quality control and spring rate tolerance control very difficult to achieve. Also, variations in steel material properties and the need for corrosion protection and heat-treating add to the cost and difficulty of producing steel wire spring modules. And furthermore, the awkward geometry of the relatively large torsional springs makes assembly of the springs in the foundation frame relatively difficult.

Another disadvantage of the use of steel wire springs in foundations, and a particular disadvantage of torsional springs, is the phenomenon of "spring set" in which a spring does not return completely to an uncompressed height following excessive loading. So long as a spring is deflected within its spring rate tolerance range, it can be repeatedly loaded for a certain number of cycles without noticeable change in operating characteristics. However, if deflected past the maximum deflection range, it will undergo permanent deformation or "set", resulting in a permanent change in operating characteristics such as lack of reflexive support, permanent change in shape, or catastrophic failure in the form of breakage. Spring set in steel wire springs may also occur simply following prolonged normal use, i.e., continuous heavy loading. This phenomenon is also generally referred to as fatigue and can result in catastrophic failure.

In addition, because wood is plentiful, easy to work, and inexpensive, it is an attractive material for use in the frames of mattress foundations. In one embodiment, the frame attachment fittings are configured for lock and key engagement with openings in the top of longitudinal frame members. This requires that the top of the upper longitudinal frame members have holes for engagement with the attachment fittings. However, once a series of holes are placed along the length of a wood frame member, the frame member is no longer capable of providing the support desired in a mattress foundation. Therefore, the present invention also provides another embodiment of the composite spring module adapted for secured engagement to wood frame members. This allows for the production of wood mattress foundations which have all of the advantageous characteristics of the composite material springs but cost less to manufacture than do comparable steel-framed mattress foundations.

In the prior art, wire-type springs have been attached directly to frame members, as for example in U.S. Pat. No. 4,867,424. In the related applications, the composite material springs are designed as low-profile springs. The low-profile springs would be configured with a frame attachment fitting that engages either a wooden frame member or a metal rail such as the patented Sealy Steel Span™ mattress foundation frame rail.

SUMMARY OF THE INVENTION

The present invention provides composite material spring modules for use as flexible support elements in support structures such as seating and bedding, and composite material spring modules which can be made in different heights or profiles. In one aspect of the invention, there is provided a spring module having a spring body made of composite material including at least a first plastic material and at least one fiber; and a second plastic material integrally formed about at least a portion of the spring body; attachment fittings made a third plastic material, the attachment fittings including grid attachment fittings configured for attachment to an overlying grid, and at least one frame attachment fitting spaced apart from the spring body by a spacer and configured for indexed engagement with an underlying frame member.

In another aspect of the invention, a single piece composite material spring module has a spring body made of composite material including at least a first plastic material and at least one fiber; and a second plastic material integrally formed about at least a portion of the spring body; attachment fittings made of a third plastic material, the attachment fittings including grid attachment fittings configured for attachment to an overlying grid, the mounting foot configured for direct attachment to a frame member by a fastener, and a spacer for separating the spring body from the mounting foot.

The composite material spring modules include a spring body composed of a plastic enveloping and cured about reinforcing fibers, and a second plastic or polymeric material from which attachment fittings are integrally formed or molded about or bonded to the spring body. The material of the attachment fittings may be the same or different than the plastic material of the spring body. For spring modules for a mattress foundation, the attachment fittings are selectively configured for attachment to members of a foundation frame structure, and to a grid or support structure which overlies the frame structure. The integral formation of plastic attachment fittings about the spring body eliminates the need for physically separate fasteners to secure the springs to the grid. A specially configured mounting foot allows the composite material spring to be mounted directly to a planar surface of a frame member. In one embodiment, a composite material spring module is configured to be attached directly to a frame member which is not otherwise specially configured to engage or receive the spring. The spring module is attached to the frame member by a fastener such as a staple which passes through a mounting portion of the spring module into the frame member.

These and other aspects of the invention are herein described in particularized detail with reference to the accompanying Drawings.

BRIEF DESCRIPTION OF THE DRAWINGS

In the accompanying Drawings:

FIG. 4 is a perspective view of a high profile mattress foundation with composite material springs of the present invention;

FIG. 7B is a perspective view of a high profile version of a mattress foundation frame with composite material spring modules of the type illustrated in FIGS. 8A and 8B;

FIG. 8A is a perspective view of a composite material spring module configured for direct mounting to a supporting surface of a frame member of a mattress foundation;

FIG. 8B is a bottom perspective view of a preferred embodiment of the composite material spring module of FIG. 8A;

FIG. 11A is a perspective view of an embodiment of a raised composite spring module of the present invention;

FIG. 11B is a cross-sectional view of the raised composite spring module of FIG. 11A;

FIG. 11C is a bottom perspective view of the raised composite spring module of FIG. 11A;

FIG. 14A is a perspective view of an embodiment of a raised composite spring module configured for direct mounting to a supporting surface of a frame member of a mattress foundation;

FIG. 14B is a cross-sectional view of the raised composite spring module of FIG. 14A;

FIG. 14C is a bottom perspective view of the raised composite spring module of FIG. 14A;

DETAILED DESCRIPTION OF PREFERRED AND ALTERNATE EMBODIMENTS OF THE INVENTION

Figure 1A:
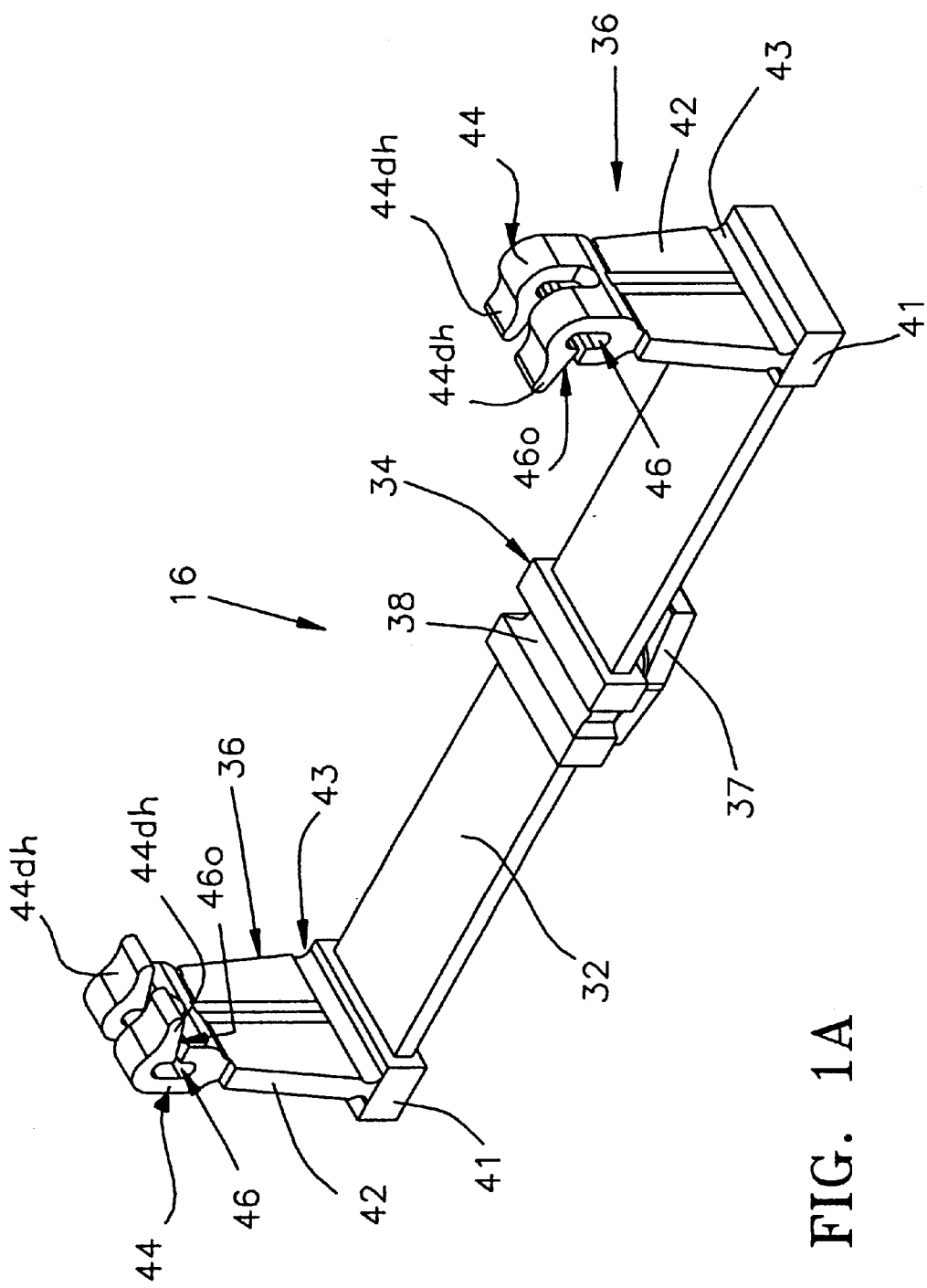
FIGS. 1A–1C are perspective views of embodiments of a composite material spring module of the present invention.

The present invention describes various embodiments of composite material spring modules having a generally planar elongate spring body. As with all embodiments of the present invention, the spring body 32 is suitably made of a composite material fiber-reinforced plastic, or a first plastic material and a fiber. Around at least a portion of spring body 32 is any structurally appropriate material, such as plastic or metal, and molded around, bonded, fastened or secured to body 32. Preferably, a second plastic material is integrally formed around at least portion of the spring body 32. Connected to the spring body 32 is a preferably centrally disposed frame attachment fitting 34, which is preferably integrally formed with spring body 32. At opposite distal ends of body 32, grid attachment fittings 36, which are also preferably integrally formed with spring body 32. The frame attachment fitting 34 and grid attachment fittings 36 (herein collectively referred to as "attachment fittings") are suitably made of any structurally appropriate material, such as plastic or metal, and molded around, bonded, fastened or secured to body 32 at the respective positions. Preferably, the attachment fittings 34 and 36 are made of the second plastic material. Alternatively, the attachment fittings 34 and 36 are suitably formed of a third plastic material that is suitably different than both the first and second plastic materials.

In a presently preferred embodiment, attachment fittings 34 and 36 are integrally formed about the spring body 32 by an insert molding process. The molding process, a spring body 32 (of the simple planar, rectangular configuration shown or any of the other configurations described herein and in the related applications) is placed in a mold having a cavity for receiving body 32 and connected cavities in the forms of fittings 34 and 36. The mold is then injected with any suitable moldable material such as polypropylene, polyethylene, Santoprene™, nylon or ABS such that the moldable material partially or completely encapsulates the spring body 32. Alternatively, the entire module 16 (including the body 32 and fittings 34 and 36) is suitably molded as a single piece such as from fiber reinforced plastic material. In addition, the attachment fittings 34 and 36 suitably separately molded or pultruded and then bonded or glued to the spring body 32.

The spring module body 32 is suitably produced from a wide variety of composite materials such as fiber reinforced plastic, fibers in combination with epoxy or vinyl or polyesters, high density plastic such as polyethylene, high density plastic foam, encapsulated steel and steel alloys, or any other material that exhibits the desired spring rates and cycle duration. When made of a fiber-reinforced composite material, the spring modules 16 are suitably pultruded or compound molded and/or compression molded into the configuration of a male/female mold cavity under heat and pressure. For example, continuous fiberglass strands, approximately 60% to 80% of the product volume, are suitably saturated with a resin system by winding or pultrusion through a bath of epoxy or vinyl ester which is approximately 20% to 40% of the product volume. The material is then suitably loaded into a compression mold, molded and cured. Flash is suitably removed by conventional methods, such as a vibrating pumice bed. The molding material is suitably selected, altered, and blended so as to produce modules of different spring rates.

The spring bodies 32 are preferably of generally linear configuration and are preferably formed by a pultrusion process wherein the reinforcing fibers are drawn through a bath of the plastic material in a liquid state and through a die which defines the cross-sectional configuration of the spring body 32, after which the spring body 32 is cut to the desired length. Pigments are suitably used in the molding material to readily identify spring modules 16 of different spring rates, which greatly aids the assembly process described below. As used herein, the term "composite" refers to the combination of a plastic material of the spring body 32 and fibers in the spring body 32. The term "composite" also herein refers to the combination of a material which is suitably molded about the spring body 32 to form the attachment fittings 34 and 36, as described below in detail.

Certain configurations of the composite material spring modules 16, as further disclosed below, are suitably formed by pultrusion and continuous pultrusion of, for example, fiber-reinforced plastic, wherein fiber strands (including but not limited to glass fibers, Kevlar®, Mylar®, graphite, carbon or steel strands) are pulled from a reel through a resin impregnating bath, and continuously pulled through a forming and curing die. The continuous strand of composite material is then cut transversely (i.e., along the cross-section of the part) to any desired length to provide the finished spring body 32. Pultrusion is particularly well suited for very high volume mass production of spring bodies 32 having substantially linear configurations. Curvilinear spring module configurations are suitably pultruded and/or pultruded and compression molded as described. A significant advantage of formation of spring modules 16 by these processes is the ability to easily alter the spring characteristics of modules 16 simply by altering the number of fibers, and/or the location or orientation of the fibers within the spring body 32. In a presently preferred embodiment, the fibers are aligned with a length dimension of the spring body 32, and extend substantially the entire length of the spring body 32. In alternate embodiments, the fibers are suitably oriented to intersect at fixed or random angles.

The attachment of the composite material spring modules 16 will now be described in the context of mattress foundations having an underlying frame structure that supports the spring modules 16, and an overlying grid reflexively supported by the spring modules 16. However, it will be appreciated that it is well within the scope of the invention to attach the spring modules 16 to any type of supporting structure or framework, and to optionally attach any type of structure or assembly to the spring modules 16 whereby the spring modules 16 provide a reflexive surface or object. Some specific examples of structures and assemblies to which the spring modules 16 are suitably attached include all types of furniture, seating including vehicle and aircraft seating, energy absorbing walls, floors or other surfaces such as vibration dampening supports, and suspension systems.

Figure 2:
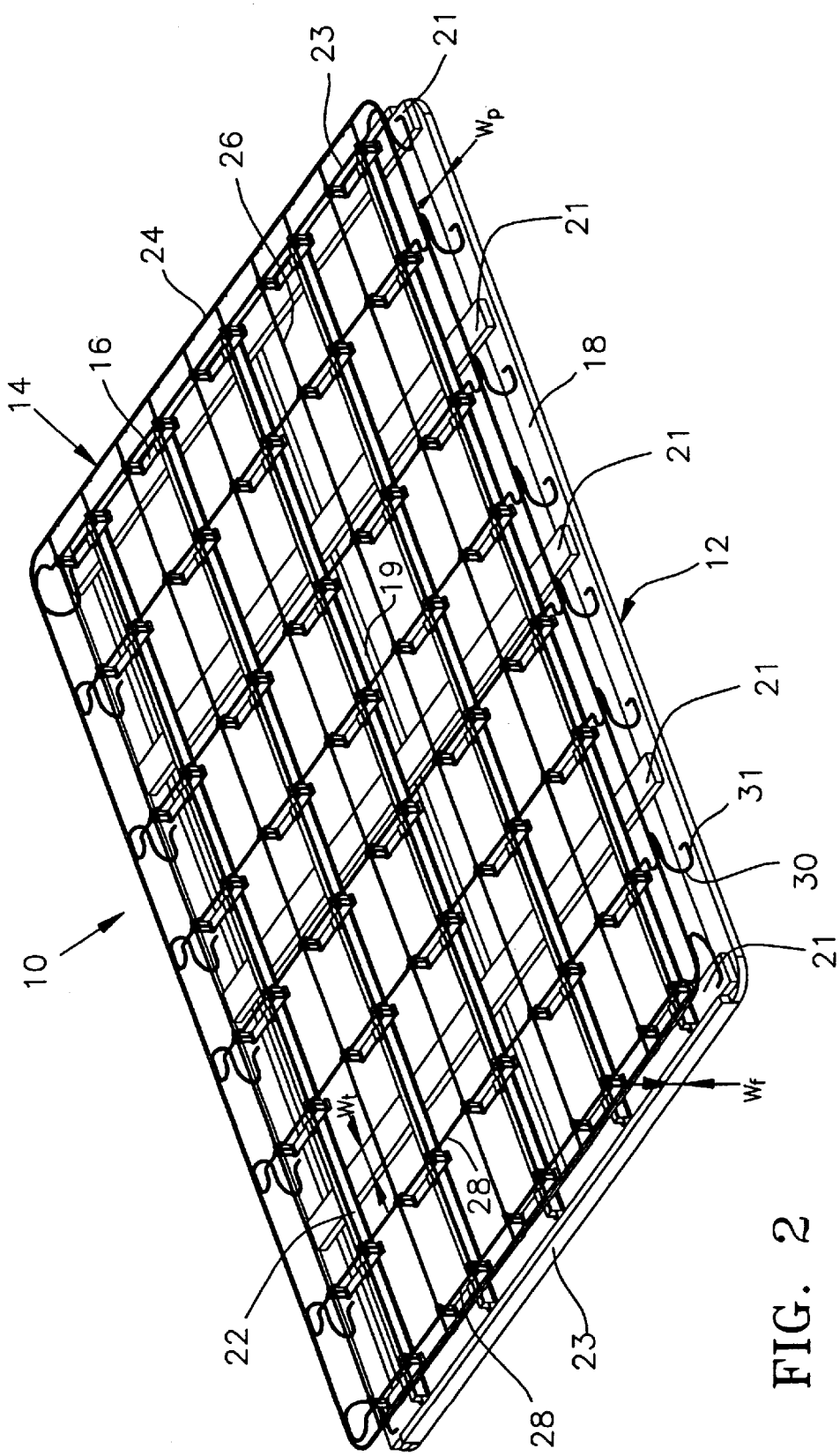
FIG. 2 is a perspective view of a low profile mattress foundation with composite material spring modules of the type illustrated in FIG. 1A.

Turning now to FIG. 2 one embodiment of a low profile mattress foundation of the invention having a plurality of composite material spring modules constructed in accordance with the invention is disclosed. The mattress foundation 10 comprises a novel low profile frame, indicated generally at 12 which supports a plurality of spring modules 16, which are suitably made of composite material and attached to a grid or matrix 14 disposed parallel to and above frame 12. The grid 14 suitably acts as a mattress supporting surface. The frame 12 suitably comprises two longitudinally extending perimeter members 18, a central longitudinal member 19, and a plurality of intermediate transverse members 21, all of which are suitably constructed of wood, steel or other metals such as aluminum, or other suitable materials such as pultruded or extruded beam-like parts, or blow-molded or structural foam parts. The frame members 18, 19 and 21 are preferably secured together to form a rectilinear frame 12.

In the low profile frame 12, the transverse members 21 are suitably laid flat with a major width $w_t$ parallel to and flush against the major widths $w_p$ of longitudinal members 18 and 19, and the narrow edges e orthogonal to the top surfaces of members 18 and 19. A plurality of longitudinally extending upper longitudinal frame members 22 (which are suitably constructed of wood or steel, or extruded or pultruded plastic such as polyethylene or polypropylene, PVC or fiberglass reinforced plastic) are suitably attached orthogonal to the major widths $w_t$ (top surfaces) of transverse members 21. An end fascia board or strip 23 is suitably attached to each transverse end of the frame, against the outer narrow edge of the transverse perimeter members 21 at the ends of the longitudinal perimeter members 18. A major width $w_f$ of fascia board 23 is thereby perpendicular to the major width $w_t$ of end transverse members 21 and a bottom narrow edge of the fascia board 23 is flush with bottom surfaces of the longitudinal members 18 and 19. The bottom edge of the fascia strip 23 is suitably flush with the bottom surfaces of the perimeter frame members to create a smooth continuous surface for attachment of upholstery. The fascia board 23 suitably extends vertically above the end transverse members 21 to provide a chock against which the ends of upper longitudinal frame members 22 abut. With the upper longitudinal frame members 22 cut to equal length, abutment of the ends against the fascia strips 23 insures that the frame is chocked and square when the members are fastened together. The spring modules 16 are by suitably attached to top surfaces of the upper longitudinal frame members 22 as further described below.

As shown in FIG. 2, and as applies to all foundations of the present invention, the grid 14 is formed by a peripheral border element 24 (also referred to herein as "borderwire") of generally the same width and length dimensions of frame 12, a plurality of longitudinal elements 26 suitably secured to the borderwire 24 by clips or welds or simply bent or hooked around the borderwire 24, and a plurality of transverse grid elements 28 (also referred to herein as "crosswires") which intersect longitudinal elements 26 to define a generally orthogonal grid 14 which forms a support surface for a mattress. The transverse elements 28 are suitably thicker than the longitudinal elements 26. The grid 14 (including elements 24, 26 and 28) is suitably constructed of low carbon or high carbon steel, but is alternatively formed of composite material such as fiber reinforced plastic. The fiber reinforced plastic is then suitably connected in an orthogonal matrix or other arrangement such that the plastic elements are bonded or glued, ultrasonically welded, or otherwise fastened. In addition, a grid 14 is suitably or formed as a single integrated structure by plastic or composite material molding processes suitable for relatively large structures such as rotational molding or injection molding.

As further shown in FIG. 2, the terminal ends of transverse elements or crosswires 28 are suitably downwardly bent to form vertical support elements 30 with mounting feet 31 secured to frame 12 to support the peripheral borderwire 24. The crosswires are also suitably clipped to the grid 14 over frame 12. Support elements 30 are suitably selectively formed to any desired height above frame 12 to extend from the borderwire 24 to longitudinal members 18 and are configured to deflect in the manner of a spring as is known in the art. The grid 14 is supported over frame 12 by the plurality of spring modules 16 attached at a bottom point to upper longitudinal frame members 22 and at upper points about the intersection of elements 26 and 28 of grid 14. In addition, the transverse elements 28 suitably comprise notches between borderwire 24 and the spring module 16 closest to borderwire 24 for preventing the spring modules 16 from migrating toward borderwire 24. The notches are suitably either vertically or horizontally offset.

Figure 1B:
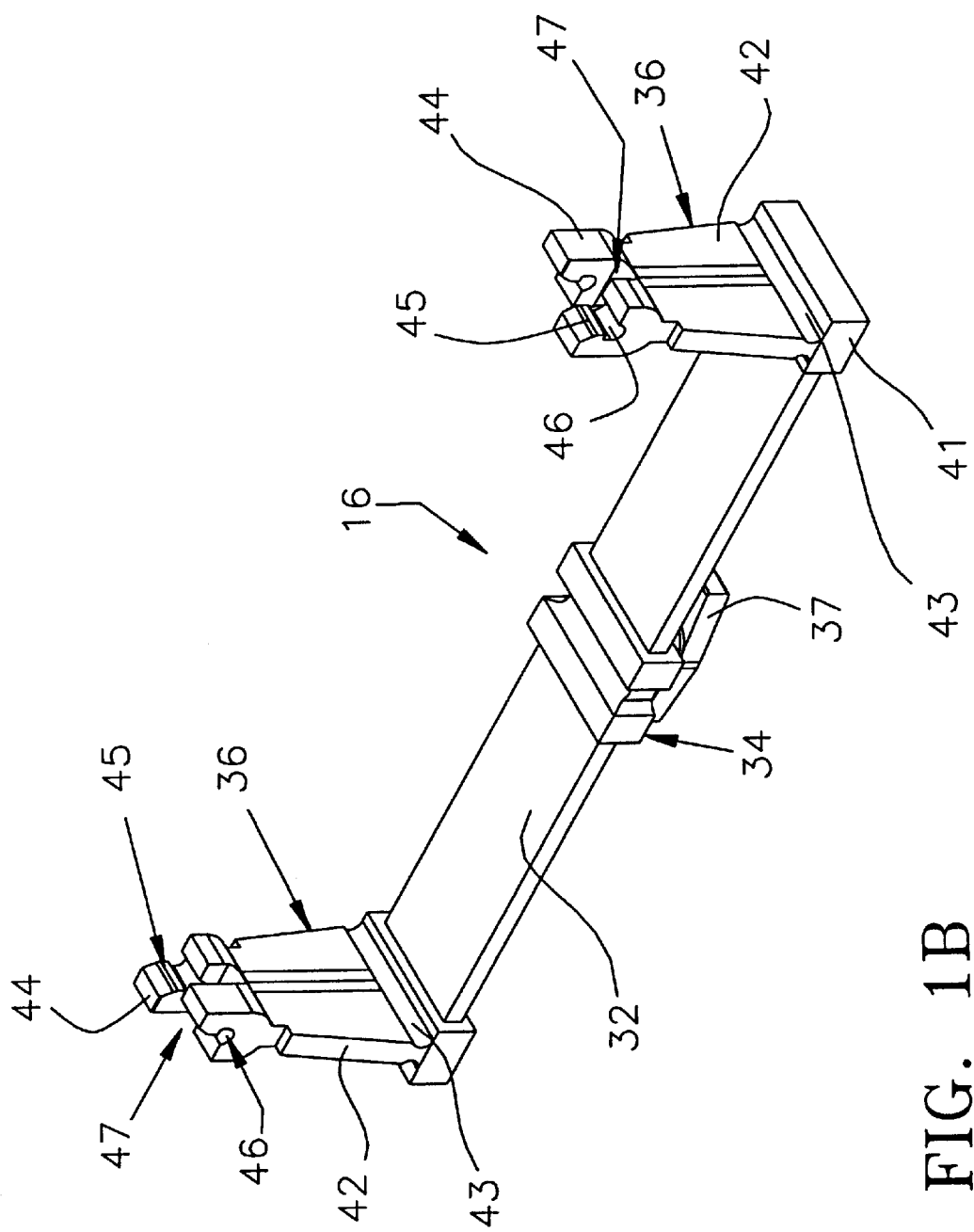
Figure 1C:
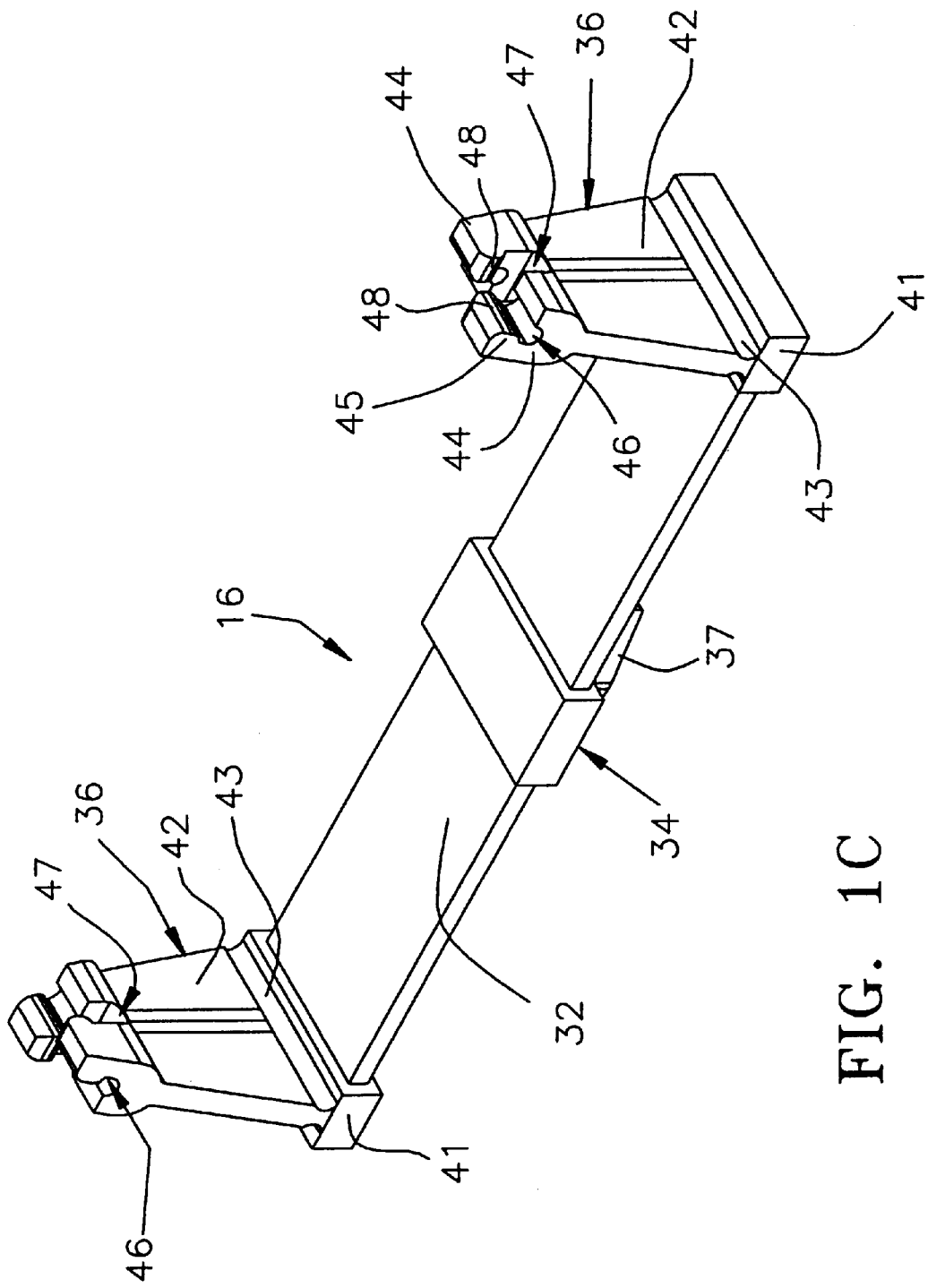

Turning now to FIGS. 1A–1C, different embodiments of a composite spring module of the invention are disclosed. Each of the grid attachment fittings 36 comprises a base 41 suitably secured to or formed about a distal end of the spring body 32. The grid attachment fittings 36 also comprise an upright member 42 (also referred to as a "stanchion") attached at one end through a flexible hinge 43 to base 41, and a pair of gripping fingers 44 at an opposite end of the stanchion 42 configured to attach about a longitudinal grid member 26 and to form a channel 47 configured to accept a transverse grid member 28.

As shown in FIG. 1B, each of the gripping fingers 44 can alternately be formed with a radiused head 45 which extends over channel 46 dimensioned to receive and frictionally engage grid member 26, similarly, a second channel 47, orthogonal to channel 46, is dimensioned to receive transverse grid member 28. As shown in FIG. 1C, second radiused heads 48 may be provided which extend over channel 47 to frictionally engage transverse member 28. On the grid attachment fittings 36 of the spring modules 16 in FIG. 1A and FIGS. 3A and 3B, each of the gripping fingers 44 includes a laterally extending locking tab $44_{dh}$ which is generally aligned with the length of the module body 32 and extends over an interior side opening 46, into channel 46 in which a longitudinal grid member 26 is received in the foundation assembly. The interior side opening $46_o$ allows the longitudinal grid members 26 to easily enter channel 46, and the locking tabs $44_{dh}$, each formed with a downwardly canted underside, guides the grid members 26 through opening $46_o$ into channel 46. Preferably, the height of opening $46_o$ is less than a cross sectional width of member 26, whereby the locking tabs $44_{dh}$ are forced upward as the member 26 passes through opening $46_o$, and then snap down to capture and retain grid members 26 within channel 46.

Figure 3A:
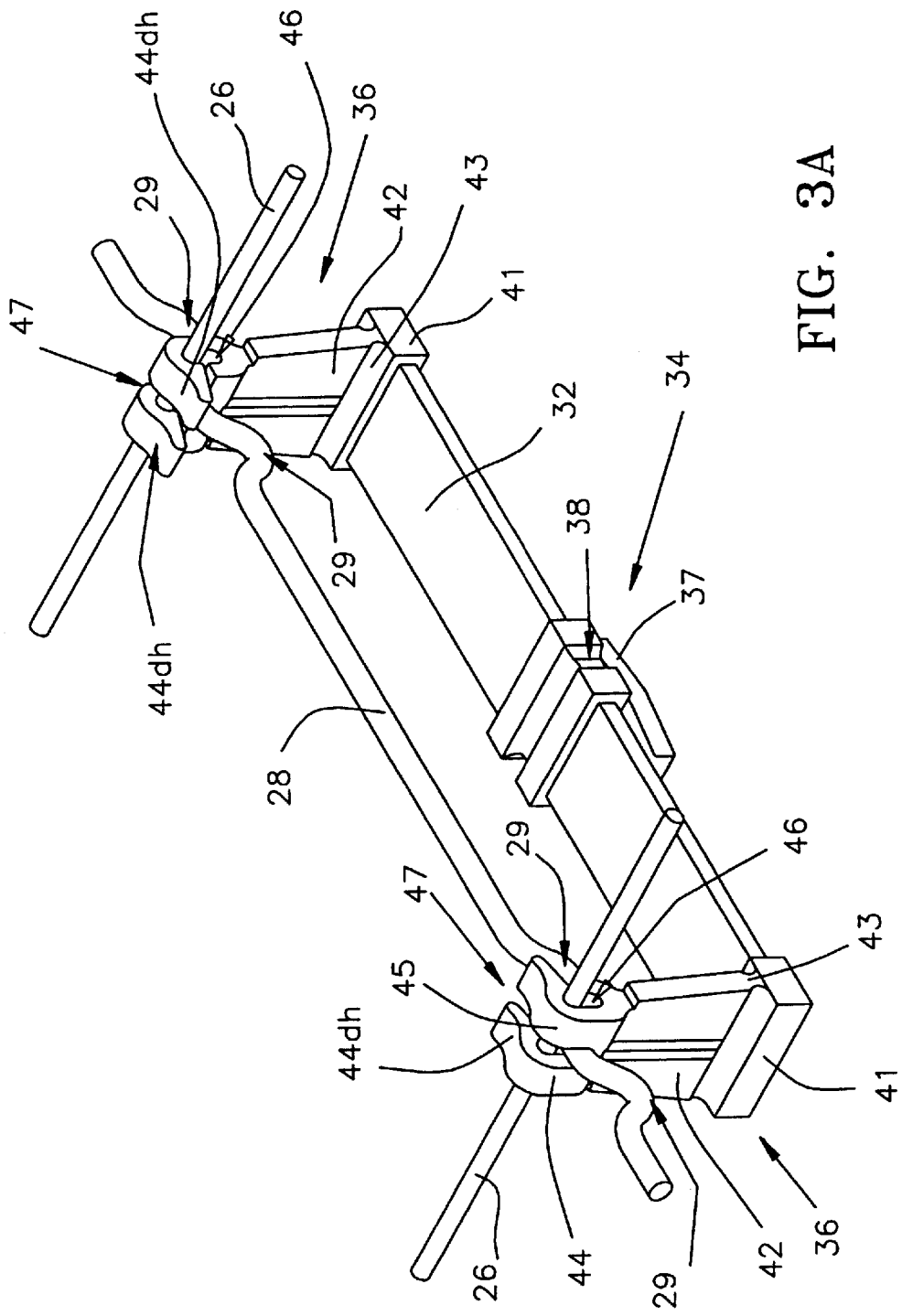
FIGS. 3A and 3B are perspective views of composite material spring modules of the type illustrated in FIG. 1A engaged with intersecting members of a mattress foundation grid.

Turning now to FIG. 3A, an illustration of the interaction of a transverse grid member and a longitudinal grid member with a composite spring of the present invention is shown in detail. The longitudinal grid member 26 overlaps transverse grid member 28 to lock the transverse grid member 28 into channel 47. Vertically offset notches 29 in transverse grid member 28 are spaced to closely straddle the upper distal end of stanchion 42 to restrict movement of the grid attachment fittings 36 along the length of transverse member 28. The grid attachment fittings 36 flexibly secure the intersecting grid members 26 and 28 in the correct relative positioning and facilitate rapid assembly of the foundation. The flexible hinge 43 disposed between the spring module body and the grid enables multi-dimensional live response to any load placed on the grid. Formation of the entire grid attachment fitting 36 of a flexible plastic is particularly advantageous for permitting infinite degrees of load deflection, and for eliminating the possibility of noise generation at the gripping finger 44/stanchion 42 interface.

Figure 3B:
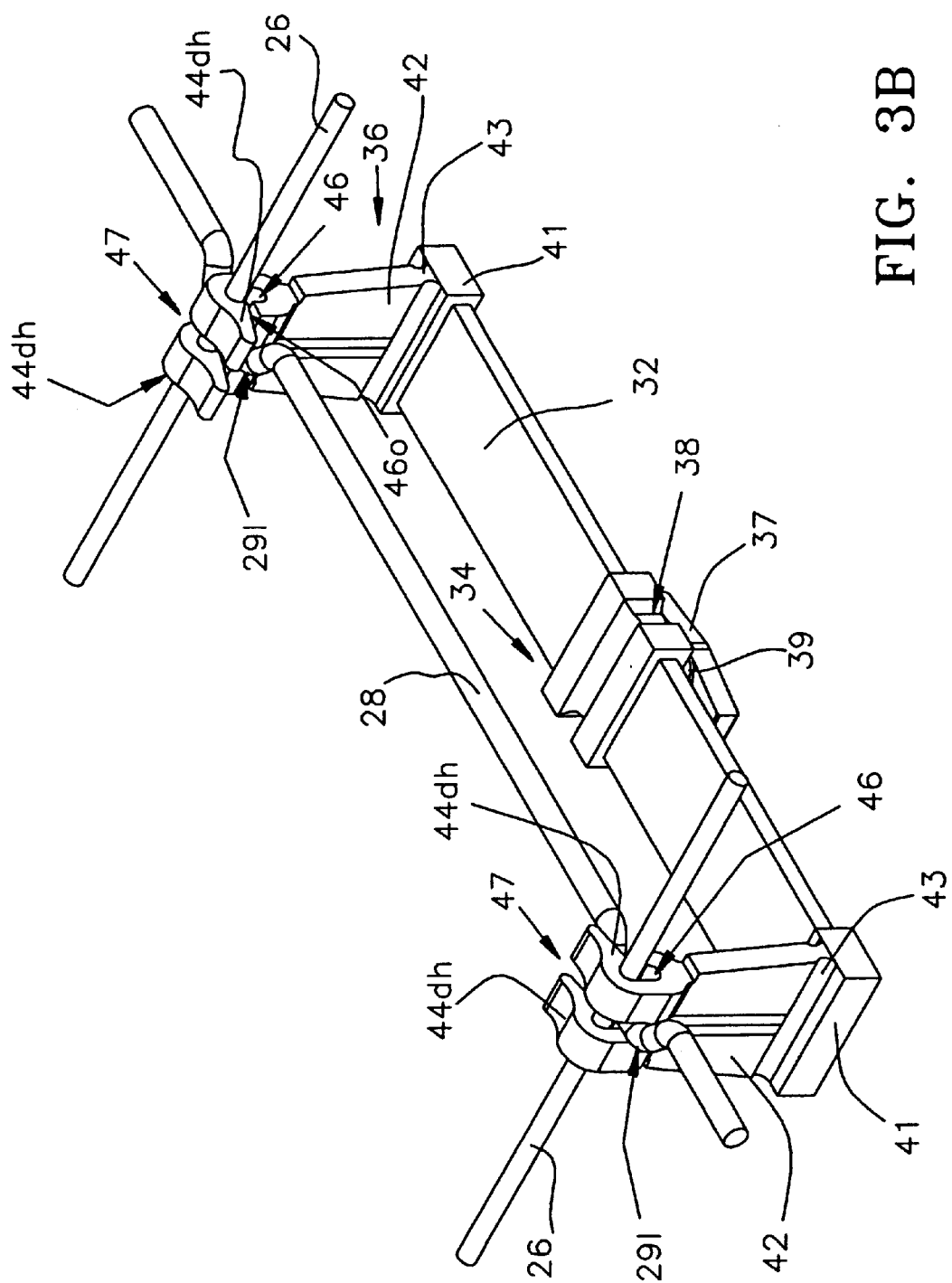

Turning now to FIG. 3B, an illustration of another embodiment of the interaction of a transverse grid member and a longitudinal grid member with a composite spring of the present invention is shown in detail. A transverse grid member 28 comprises horizontal or lateral offsets 291 of a linear extent sufficient to traverse channel 47 which runs between gripping fingers 44. The lateral offsets 291 are horizontal in the sense that they extend laterally in a plane defined by the top surface of a grid in which the crosswire 28 is incorporated. By this arrangement, the grid attachment fittings 36 are restricted from movement along the length of transverse grid member 28. In addition, the lateral offsets 291 aid in preventing lateral displacement of the spring module 16 along longitudinal grid members 26. Furthermore, the horizontal lateral offsets 291 are overlapped by a portion of the locking tabs 44 which strengthens the mechanical engagement of the intersecting grid members 26 and 28 within the attachment fittings 36.

The frame attachment fitting 34 is preferably configured for indexed engagement with an opening in the top of an upper longitudinal frame member 22. The frame attachment fitting 34 suitably comprises a key 37 preferably having a length dimension greater than a width dimension. Preferably, the key 37 has a length that is generally aligned with the length of the spring body 32. A correspondingly sized hole is suitably provided in the top of the upper longitudinal frame members 22 through which the key 37 is suitably passed. The length dimension of the key 37 is preferably greater than a width dimension of a hole in frame member 22. Extending between and connecting spring body 32 and the key 37 is a neck 39. In the presently preferred embodiment, the neck 39 is generally cylindrical in shape having a height dimension approximately equal to the thickness of upper frame member 22. The cylindrical shape of the neck 39 allows for easy rotation of the key 37 once it is placed within a hole in upper frame member 22. The height dimension of the neck 39 is chosen such that a tight fit exists once the key 37 is inserted in a hole in upper frame member, thus mechanically and frictionally engaging the spring module 16 with the frame member 22. Alternatively, the hole in frame member 22 is suitably dimensioned at one point to receive the key 37 and neck 39 with clearance, and further includes an adjacent smaller area which captures the key 37 when the frame attachment fitting 34 is slid into the smaller area of the hole. A key 37 configured for sliding engagement in a frame member hole is shown in FIGS. 6B and 6C.

This simple manner of attachment of the spring modules 16 having attachment fittings 34 and 36 to the frame members 22 eliminates the need for additional fasteners to secure the modules 16 to the frame 12. The attachment fittings 34 and 36 enable simple and fast attachment of the spring modules 16 to the frame 12 and the overlying grid 14. The interlocking mechanical engagement of the attachment fittings 34 and 36 of the spring modules 16 with a mattress foundation or any other structure, such as seating and furniture, is ideally suited for either manual or automated assembly of the foundations of the invention. Also, the inherent flexibility of the fittings 34 and 36 formed of flexible/plastic material (and preferably of a material more flexible than the non-fiber material of the spring body) gives the entire spring module 16 multiple degrees of freedom relative to the frame 12 and grid 14, and eliminates any possibility of noise generation at the points of connection of the attachment fittings 34 and 36 to a frame 12 or grid 14.

The described foundation as depicted in FIG. 2 has a relatively low height or profile in that the overall height, measured from the bottom surface of the frame to the top of the grid, is substantially less than the height of conventional foundations having wire spring modules which stand as tall as seven or more inches high. The low profile height dimension of the foundation of the invention is attainable as a result of the minimal height dimension of the composite material spring modules 16 and attachment fittings 34 and 36. Although the spring modules 16 have a low profile, they have deflection characteristics comparable or superior to wire form springs having a substantially higher profile.

Nonetheless, the foundation 10 is suitably constructed to have any desired height dimension wherein the modules 16 are suitably free to deflect about the point of attachment to the supporting frame members 22. Turning now to FIG. 4, an illustration of an embodiment of a higher profile foundation is disclosed. The foundation suitably has a high profile frame, indicated generally at 25, wherein the transverse frame members 21 are oriented with a major width $w_1$ oriented vertically to achieve a greater height dimension and elevates the longitudinal frame members 22 (and spring modules 16) mounted on narrow edge e. In other words, the perimeter members 18 are flat, while the transverse members 21 are upright. The narrow bottom edges e of the transverse members 21 rest upon the top surfaces or major widths $w_p$ of the longitudinal perimeter frame members 18 and central longitudinal member 19. The upper longitudinal frame members 22 are attached to the narrow top edges e of the transverse members 21. End fascia strips 23 are similarly vertically oriented along the side of the end transverse members 21, with a major width $w_f$ oriented vertically, perpendicular to the major widths $w_p$ of the longitudinal members, and the narrow bottom edges of the transverse members flush with the bottom of the longitudinal perimeter frame members 18. This construction provides a very stiff frame with the transverse ends reinforced by side-by-side vertically oriented double board thickness. Of course, the rigidity of the transverse members 21 is optimized by loading upon the narrow edges e, on which the longitudinal frame members 22 rest. Additional frame members are suitably used to achieve even greater heights and stiffness. Alternatively, the length of upright members 42 of the grid attachment fittings 36 are suitably designed to produce any reasonable desired height of the grid 14 over the spring modules. In addition, a higher profile foundation is suitably achieved by increasing the height dimension of the upper longitudinal frame members 22. In a high profile foundation constructed with the high profile frame 25, the support elements 30 of the are suitably of increased height to extend from the elevated grid 14 down to the longitudinal perimeter frame members 18.

Figure 5:
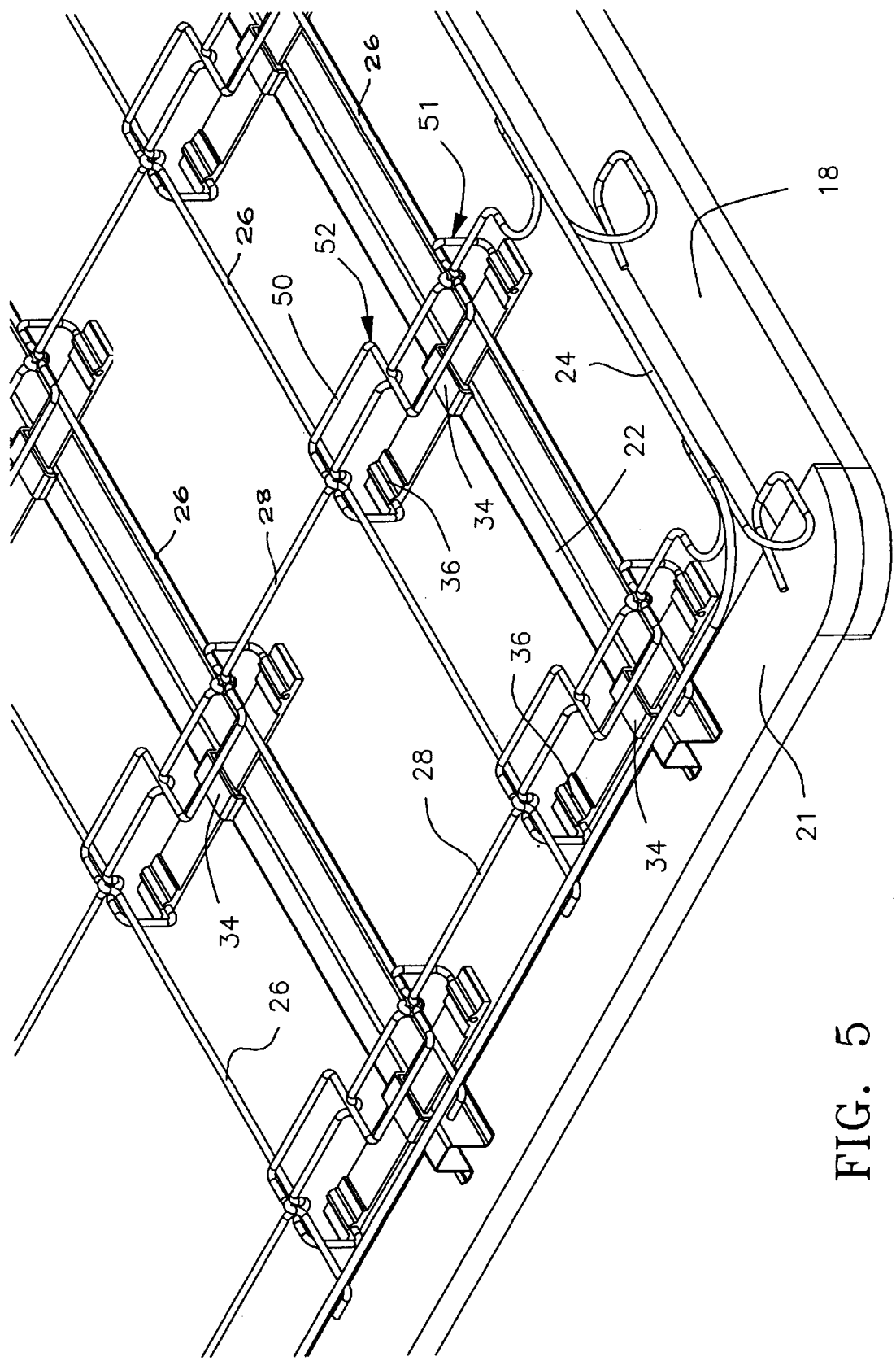
FIG. 5 is a perspective view of a portion of an alternate embodiment of a mattress foundation with composite material spring modules of the type illustrated in FIG. 1A.

Turning now to FIG. 5, a partial view of another embodiment of a foundation is disclosed. In this embodiment, the grid attachment fittings 36 are replaced by a single grid attachment wire 50, the ends 51 of which are formed to engage with an alternate form of attachment fitting 36. The ends 51 are also suitably interlockingly engaged by an intermediate section 52 between ends 51. The vertical extent of ends 51 is suitably selectively varied in manufacture to produce foundations of varied height.

Turning now to FIGS. 6A–6D, various U-shaped or C-shaped configurations of composite spring elements are disclosed. It should be noted that the fundamental concept of the invention of a composite material spring 16 having a spring body 32 having attachment fittings that are preferably integrally formed is suitably executed with spring bodies 32 of any shape or configuration.

Figure 6A:
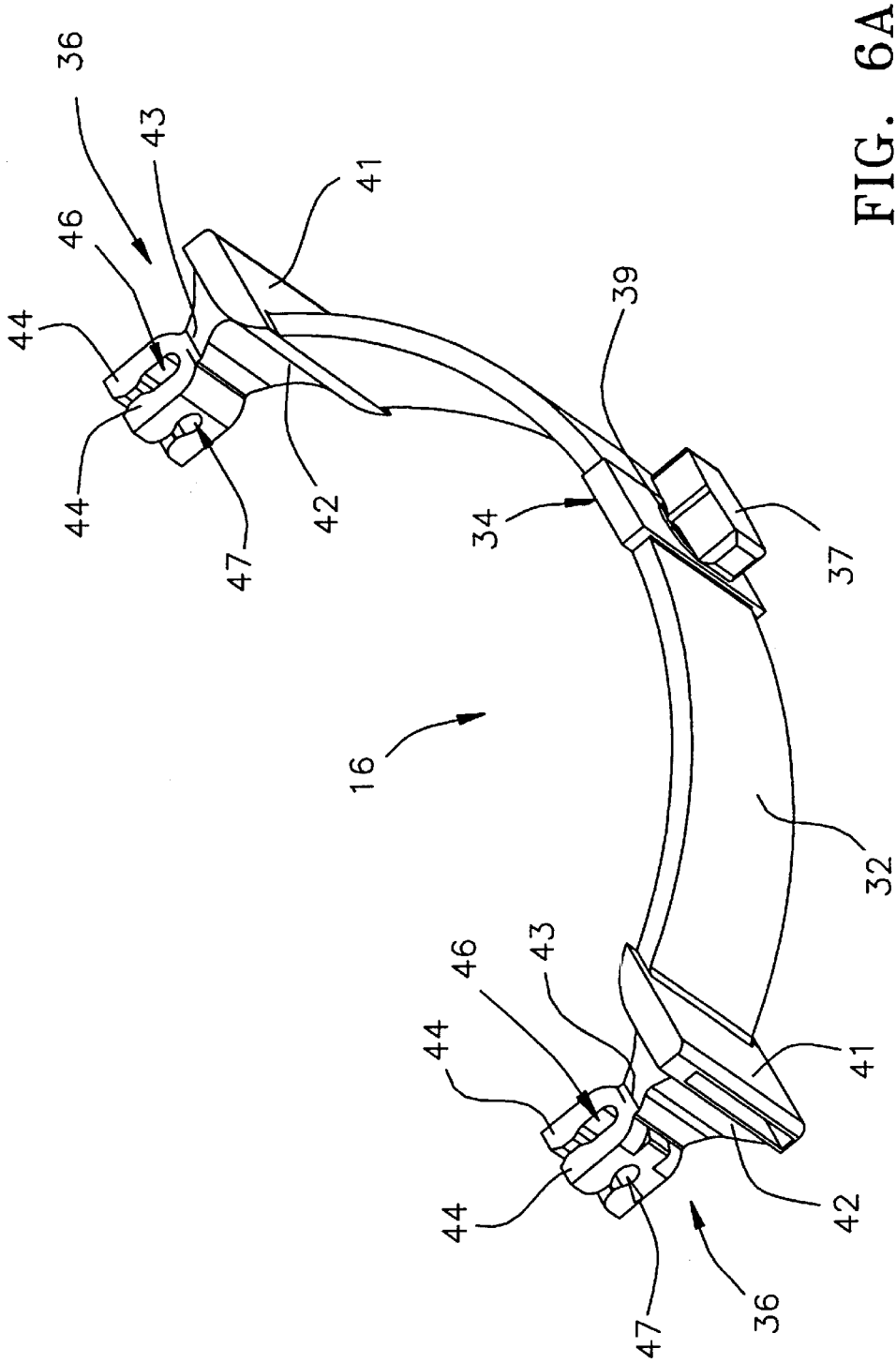
FIG. 6A is a perspective view of an alternate embodiment of a composite material spring module of the present invention.
Figure 6B:
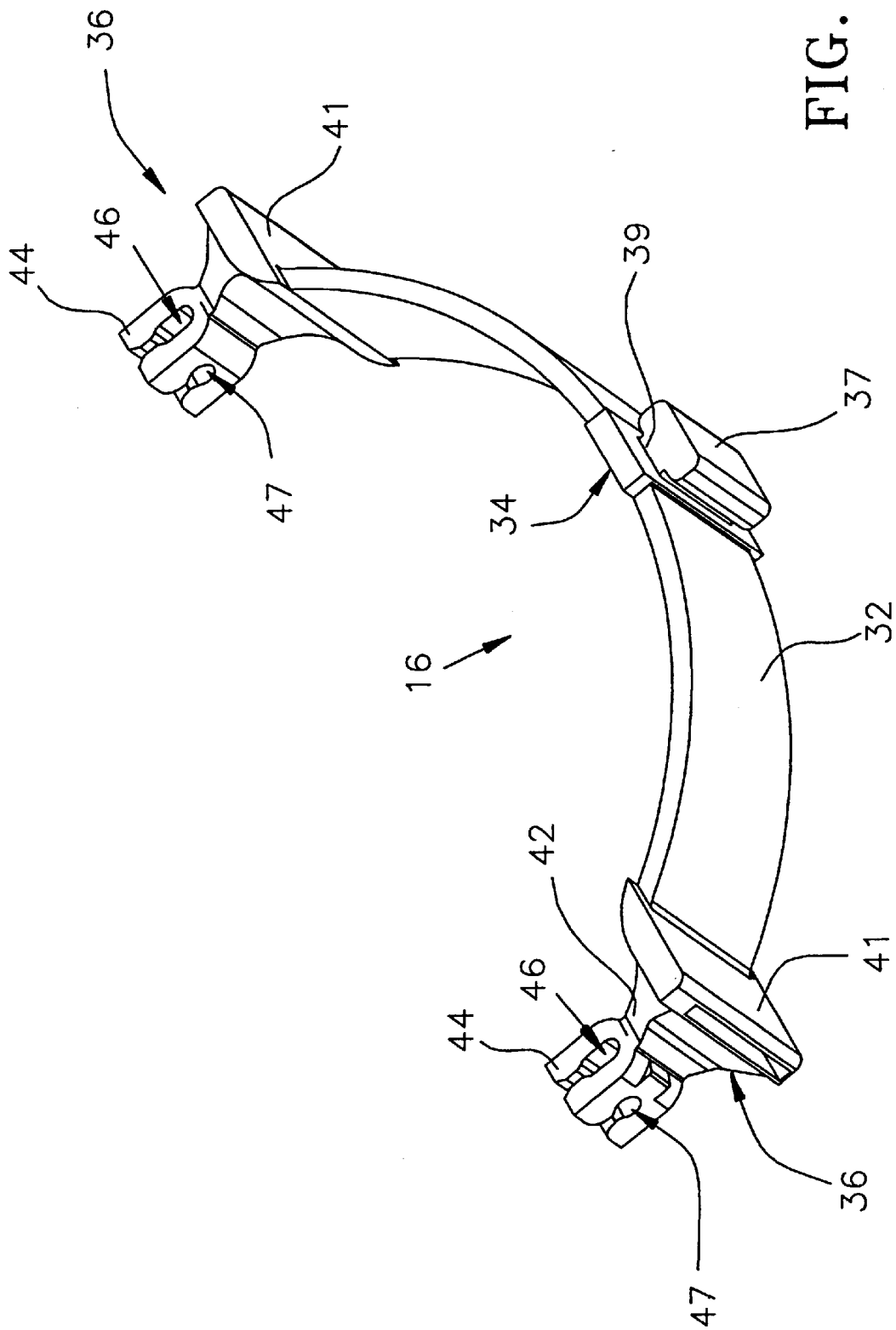
FIG. 6B is a perspective view of another embodiment of a spring module of the invention.
Figure 6C:
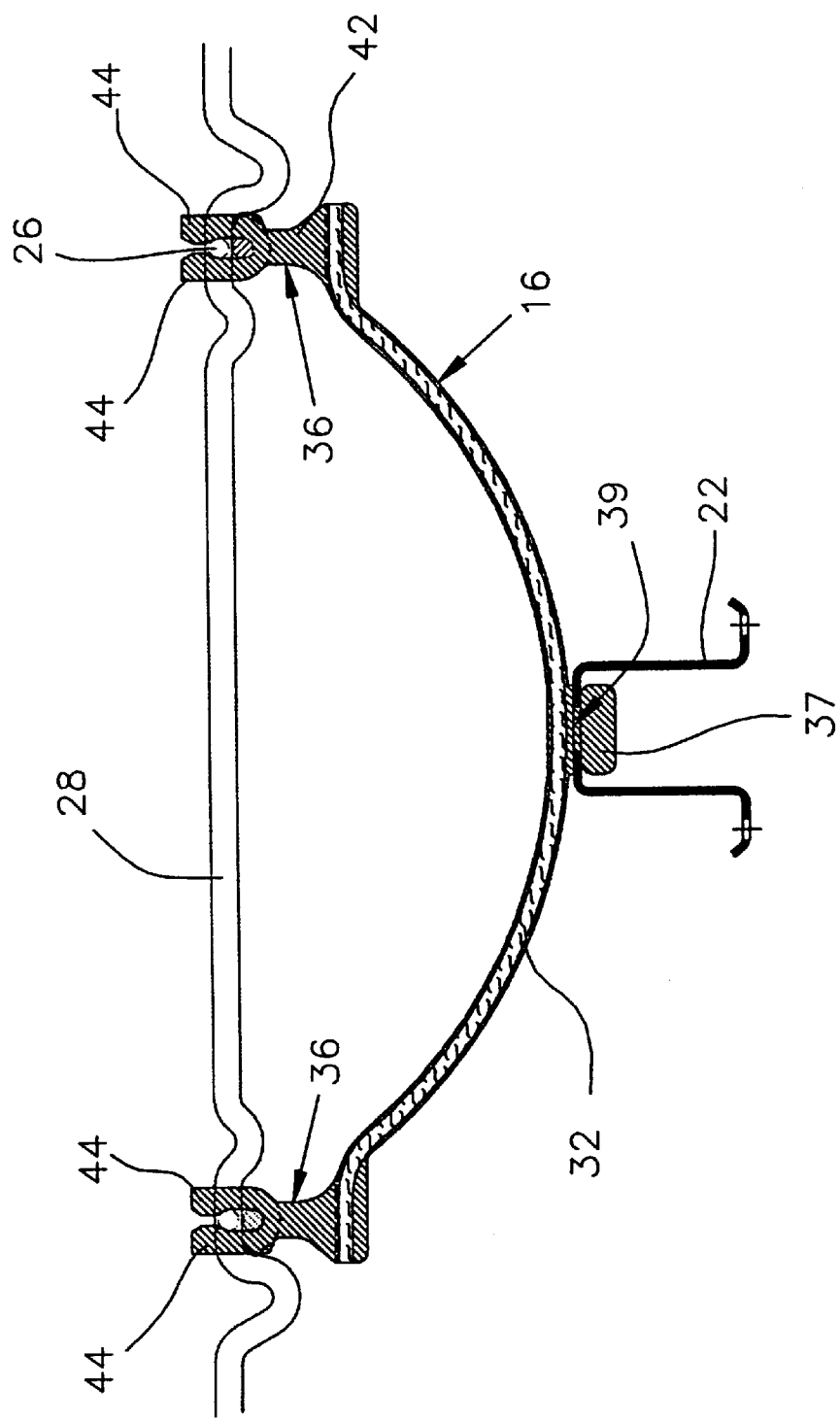
FIG. 6C is an elevation view of a spring module of the type illustrated in FIG. 6B engaged with a frame member and a grid in a mattress foundation of the present invention.

FIG. 6A illustrates a spring 16 having a generally curved body 32 with two generally flat coplanar spring ends from which grid attachment fittings 36 extend vertically, with a frame attachment fitting 34 at the approximate center of the body 32. The frame attachment fitting 34 suitably comprises a key 37 having a length dimension greater than a width dimension. The length dimension of the key 37 is preferably greater than a width dimension of a hole in frame member 22. Extending between and connecting spring body 32 and the key 37 is a neck 39. In the presently preferred embodiment, the neck 39 is generally cylindrical in shape having a height dimension approximately equal to the thickness of upper frame member 22. The cylindrical shape of the neck 39 allows for easy rotation of the key 37 once it is placed within a hole in upper frame member 22. The height dimension of the neck 39 is chosen such that a tight fit exists once the key 37 is inserted in a hole in upper frame member, thus mechanically and frictionally engaging the spring module 16 with the frame member 22.

The U-shape spring module 16 is configured such that compressive stress imparted on the grid 14 of the inventive bed system is absorbed by the spring 16 generally in the depth dimension, and generally along the centerline of the spring module 16 and spring body 32. In addition, the spring module 16 and spring body 32 are configured and made from a material such that the spring body 32 is suitably compressed to a planar position without reaching a "spring set" condition. Accordingly, even if the inventive bed foundation 10 is subjected to excessive load conditions, the U-shape spring modules 16 will not deform or otherwise fail because even at maximum deflection they will not take a spring set.

FIGS. 6B and 6C illustrate an alternate embodiment of a U-shaped spring module 16 mounted upon an upper frame member 22 by sliding engagement. The spring 16 is designed to engage an upper frame member 22 having a hole with a larger section and a smaller section. The key 37 is then suitably inserted through the larger section of the hole and slid into the smaller section of the hole. The neck 39 is preferably configured such that when the key 37 is slid into the smaller section of the hole, the neck frictionally engages the upper frame member 22.

Figure 6D:
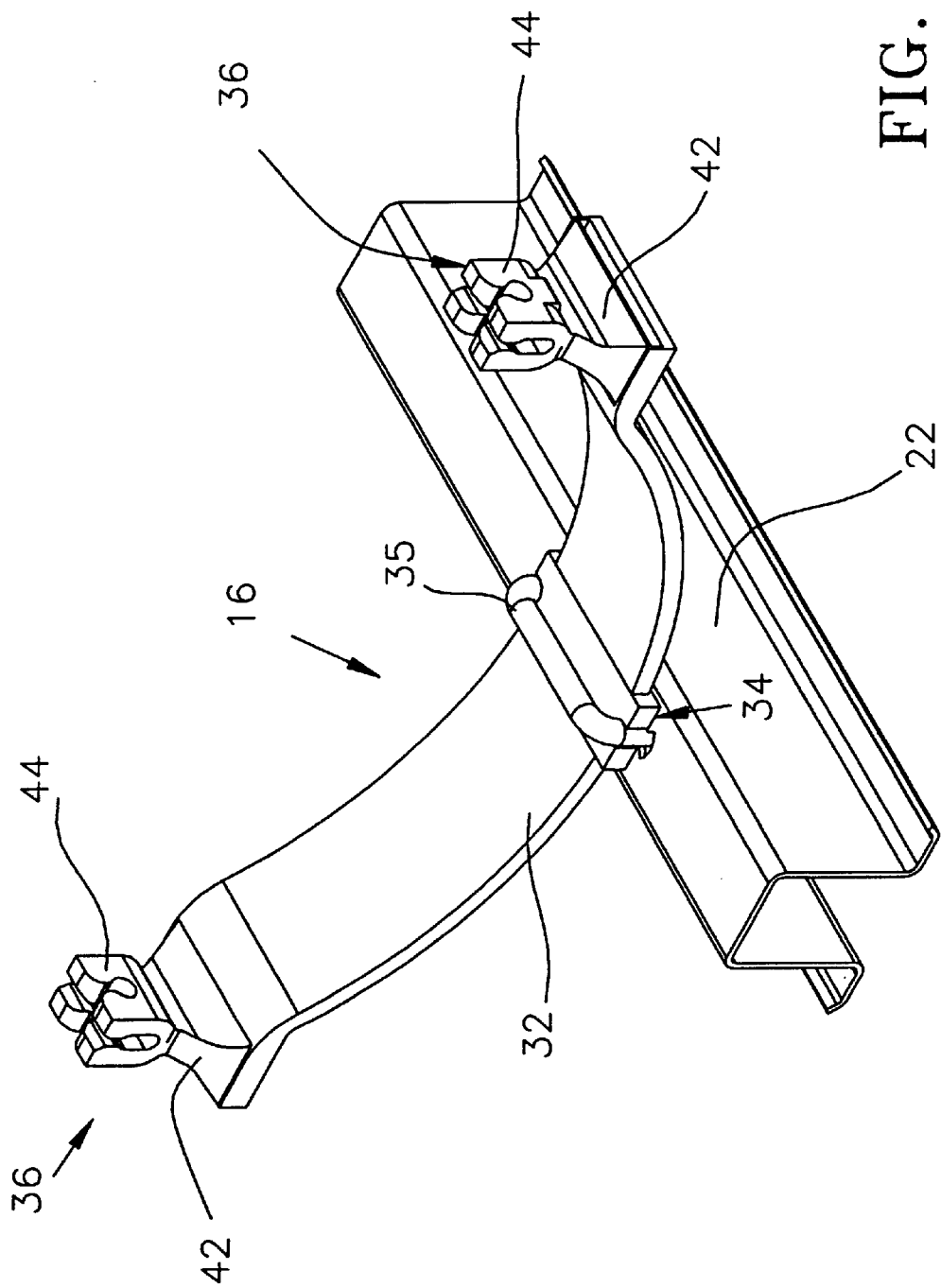
FIG. 6D is a perspective view of an alternate embodiment of a spring module of the invention attached to a frame member of a mattress foundation.

FIG. 6D shows an alternate embodiment of the spring module 16 illustrated in FIG. 6A. The spring module 16 of FIG. 6D comprises an additional mechanical fastener 35, such as in the form of a wire form or staple, which is suitably attached to further secure the spring module 16 to the upper frame member 22. For such fastener securement, an indexing groove 38 (shown FIGS. 1A and 1B) running across frame attachment fitting 34 is preferably provided. The indexing groove 38 is suitably configured to accept the additional mechanical fastener 35. For fastener securement of the spring module 16 to, for example, a planar surface of a support structure such as a frame member, the key 37 and neck 39 could be eliminated to achieve flush stable mounting. In this case, the body of the frame attachment fitting 34 in which groove 38 is formed still performs an attachment function or seating for the fastener.

Figure 7A:
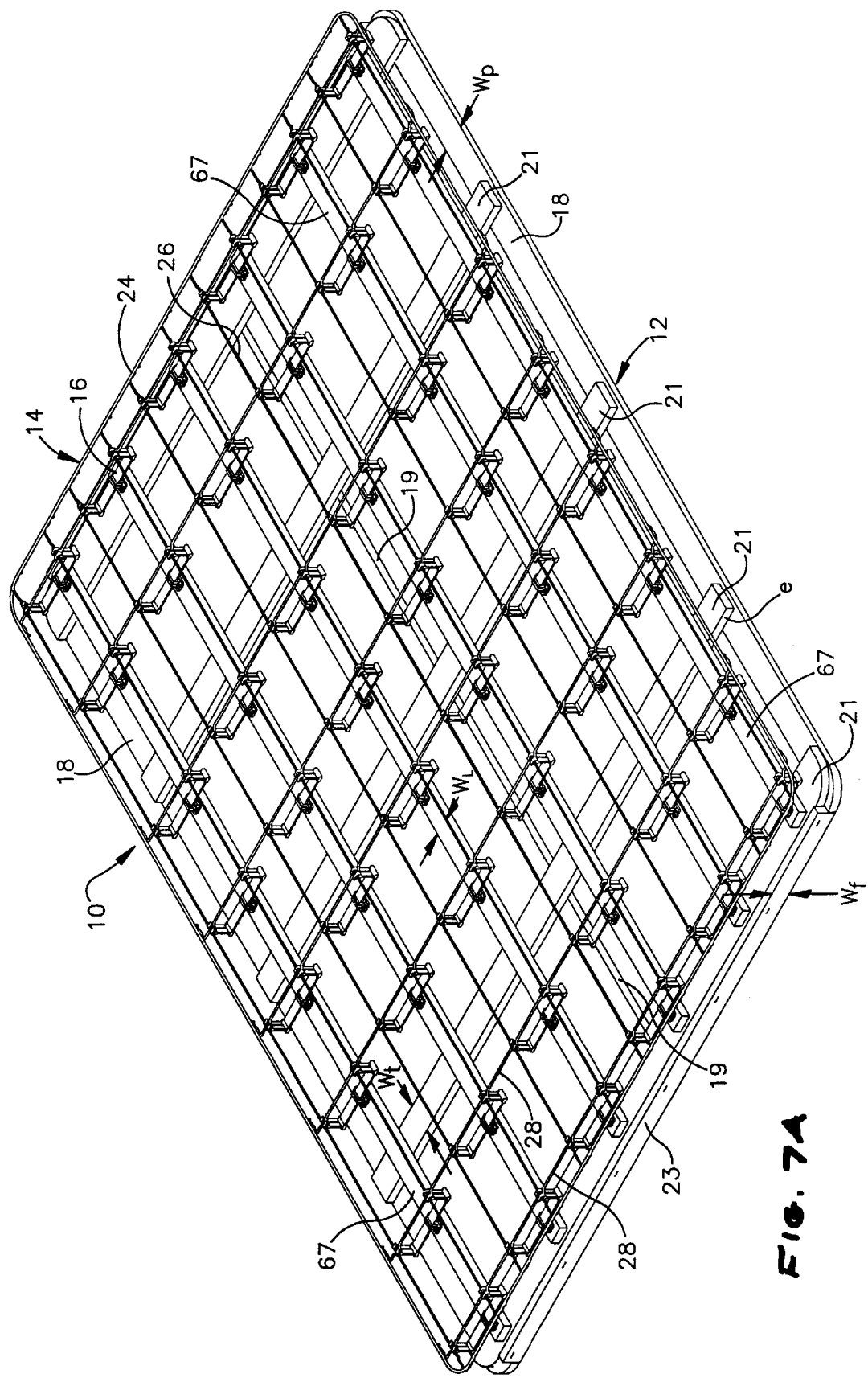
FIG. 7A is a perspective view of a low profile version of a mattress foundation frame with composite material spring modules of the type illustrated in FIGS. 8A and 8B.

Turning now to FIG. 7A a low profile mattress foundation is disclosed having a plurality of composite spring modules as shown in FIGS. 8A and 8B. The mattress foundation 10 comprises a novel low profile frame, indicated generally at 12 which supports a plurality of spring modules 16, which are suitably made of composite material and attached to a grid or matrix 14 disposed parallel to and above frame 12. The grid 14 suitably acts as a mattress supporting surface. As with the other embodiments, the invention is not limited to mattress foundations, and can be effectively employed as any type of flexible support surface such as in domestic and commercial furniture which includes a frame structure which supports spring elements. In this embodiment, the frame 12 suitably comprises two longitudinally extending perimeter members 18, a central longitudinal member 19, and a plurality of intermediate transverse members 21, all of which are suitably constructed of wood, steel or other metals such as aluminum, or other suitable materials such as pultruded or extruded beam-like parts, or blow-molded or structural foam parts. The frame members 18, 19 and 21 are preferably secured together to form a rectilinear frame 12.

In the low profile frame 12, the transverse members 21 are suitably laid flat with a major width $w_t$ parallel to and flush against the major widths $w_p$ of longitudinal members 18 and 19, and the narrow edges e orthogonal to the top surfaces of members 18 and 19. A plurality of longitudinally extending upper longitudinal frame members 22 (which may be constructed of steel or wood or extruded or pultruded plastic such as polyethylene or polypropylene, PVC or fiberglass reinforced plastic), are suitably attached orthogonal to the major widths $w_t$ (top surfaces) of transverse members 21. An end fascia board or strip 23 is suitably attached to each transverse end of the frame, against the outer narrow edge of the transverse end perimeter members 21 at the ends of the longitudinal perimeter members 18. A major width $w_f$ of fascia board 23 is thereby perpendicular to the major width $w_t$ of end transverse members 21 and a bottom narrow edge of the fascia board is flush with bottom surfaces of the longitudinal members. The bottom edge of the fascia strip 23 is suitably flush with the bottom surfaces of the perimeter frame members to create a smooth continuous surface for attachment of upholstery. The fascia board 23 suitably extends vertically above the end transverse members 21 to provide a chock against which the ends of upper longitudinal frame members 67 abut. With the upper longitudinal frame members 67 cut to equal length, abutment of the ends against the fascia strips 23 insures that the frame will be chocked and squared when the members are fastened together.

The grid 14 is formed by a peripheral border element 24 (also referred to herein as "borderwire") of generally the same width and length dimensions of frame 12, a plurality of longitudinal elements 26 suitably secured to the borderwire 24 by clips or welds or simply bent or hooked around the borderwire 24, and a plurality of transverse grid elements 28 (also referred to herein as "crosswires") which intersect longitudinal elements 26 to define a generally orthogonal grid 14 which forms a support surface for a mattress. The transverse elements 28 are suitably thicker than the longitudinal elements 26. The grid 14 (including elements 24, 26 and 28) is suitably constructed of low carbon or high carbon steel, but is alternatively formed of composite material such as fiber reinforced plastic. The fiber reinforced plastic is then suitably connected in an orthogonal matrix or other arrangement such that the plastic elements are bonded or glued, ultrasonically welded, or otherwise fastened. In addition, a grid 14 is suitably or formed as a single integrated structure by plastic or composite material molding processes suitable for relatively large structures such as rotational molding or injection molding. The grid 14 is supported over frame 12 by the plurality of spring modules 16 attached at a bottom point to upper longitudinal frame members 67 and at upper points about the intersection of elements 26 and 28 of grid 14. In addition, the transverse elements 28 suitably comprise notches between borderwire 24 and the spring module 16 closest to borderwire 24 for preventing the spring modules 16 from migrating toward borderwire 24. The notches are suitably either vertically or horizontally offset.

Turning now to FIG. 7B, a higher profile foundation is disclosed. The foundation 10 is suitably constructed to have any desired height dimension wherein the modules 16 are suitably free to deflect about the point of attachment to the supporting frame members 67. The foundation suitably has a high profile frame, indicated generally at 25, wherein the transverse frame members 21 are oriented with a major width $w_t$ oriented vertically to achieve a greater height dimension and elevates the longitudinal frame members 67 (and spring modules 16) mounted on narrow edge e. In other words, the perimeter members 18 are flat, while the transverse members 21 are upright.

The narrow bottom edges e of the transverse members 21 rest upon the top surfaces or major widths $w_p$ of the longitudinal perimeter frame members 18 and central longitudinal member 19. The upper longitudinal frame members 67 are attached to the narrow top edges e of the transverse members 21. End fascia strips 23 are similarly vertically oriented along the side of the end transverse members 21, with a major width $w_f$ oriented vertically, perpendicular to the major widths $w_p$ of the longitudinal members, and the narrow bottom edges of the transverse members flush with the bottom of the longitudinal perimeter frame members 18. This construction provides a very stiff frame with the transverse ends reinforced by side-by-side vertically oriented double board thickness. Of course, the rigidity of the transverse members 21 is optimized by loading upon the narrow edges e, on which the longitudinal frame members 67 rest. Additional frame members are suitably used to achieve even greater heights and stiffness. Alternatively, the length of upright members 42 of the grid attachment fittings 36 are suitably designed to produce any reasonable desired height of the grid 14 over the spring modules. In addition, a higher profile foundation is suitably achieved by increasing the height dimension of the upper longitudinal frame members 67.

Turning now to FIGS. 8A–8B preferred embodiments are disclosed of a composite material spring module having with a frame attachment fitting comprising a foot support member that is configured for direct mounting and engagement with a planar surface. The spring body 32 is suitably made of a composite material fiber-reinforced plastic. Connected to the spring body 32 is a centrally disposed frame attachment fitting 34, which is preferably integrally formed with spring body 32. At opposite distal ends of body 32 are grid attachment fittings 36, which are also preferably integrally formed with spring body 32. The frame attachment fitting 34 and grid attachment fittings 36 are suitably made of any structurally appropriate material, such as plastic or metal, and molded around, bonded, fastened or secured to body 32 at the respective positions.

The frame attachment fitting 34 preferably comprises a foot support member 68, which is preferably configured for engagement with the top of a longitudinal frame member 67 having a generally rectangular cross-section. The foot support member 68 is preferably integrally formed with spring body 32 such that the connection area 681 between the spring body 32 and foot support member 68 has a width that is narrower than the width of the foot support member 68. Connecting the foot support member 68 in such manner creates a gap 682 between the foot support member 68 and spring body 32 on each side of the connection area therebetween. The decreased width connection area 681 and resulting gap 682 suitably add flexibility to the foot support member 68 in that the spring body 32 is capable of pivoting about the connection area 681.

The base 69 of the foot support member 68 is suitably generally planar, contact surface 70 of which is preferably primarily flat. The base 69 also suitably comprises a channel 71 that runs longitudinally through the center of the contact surface 70. The top surface 72 of the base 69 is also suitably generally flat, but opposite the contact surface 70 of channel 71, is an indexing ridge 73 on the top surface 72 of base 69. The channel 71 and the indexing ridge 73 both suitably run through the center of base 69 and align with indexing groove 38 such that the spring 16 is centered directly above the channel 71 and indexing ridge 73. When the foot support member 68 is secured to the frame member 67, the foot support member 68 is preferably aligned such that the center of the base 69 is located at the center of width $w_L$ of frame member 67.

Figure 10:
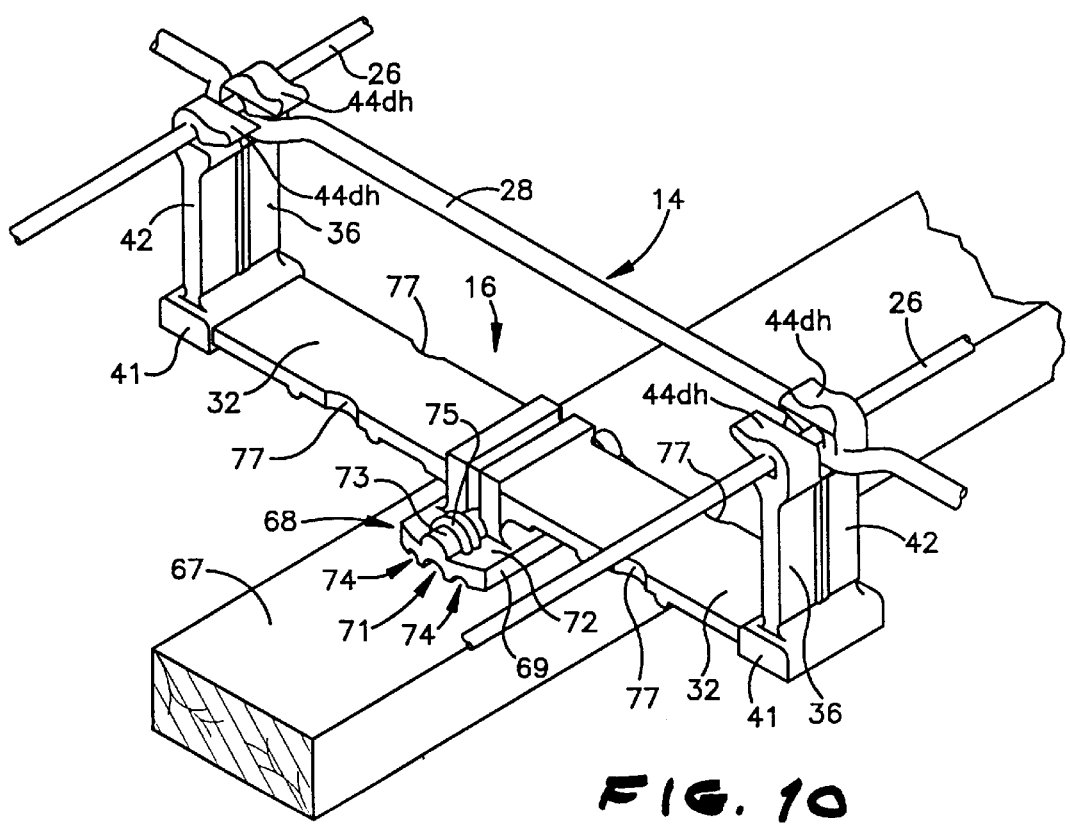
FIG. 10 is a perspective view of a composite material spring module of the type illustrated in FIGS. 8A and 8B engaged with a frame member and a grid in a mattress foundation of the present invention.

In the alternative, the base 69 suitably comprises a channel 71 running longitudinally through the center of the contact surface 70 and at least one ridge 74 on each of channel 71 running generally parallel to channel 71 (See FIG. 10). The ridges 74 suitably decrease the contact area of contact surface 70 and suitably provide the base 69 with increased flexibility.

Each of the grid attachment fittings 36 comprises a base 41 suitably secured to or formed about a distal end of the spring body 32. The grid attachment fittings 36 also comprise stanchion 42 attached at one end through a flexible hinge 43 to base 41, and a pair of gripping fingers 44 at an opposite end of the stanchion 42 configured to attach about a longitudinal grid member 26 and to form a channel 47 configured to accept a transverse grid member 28.

Figure 9A:
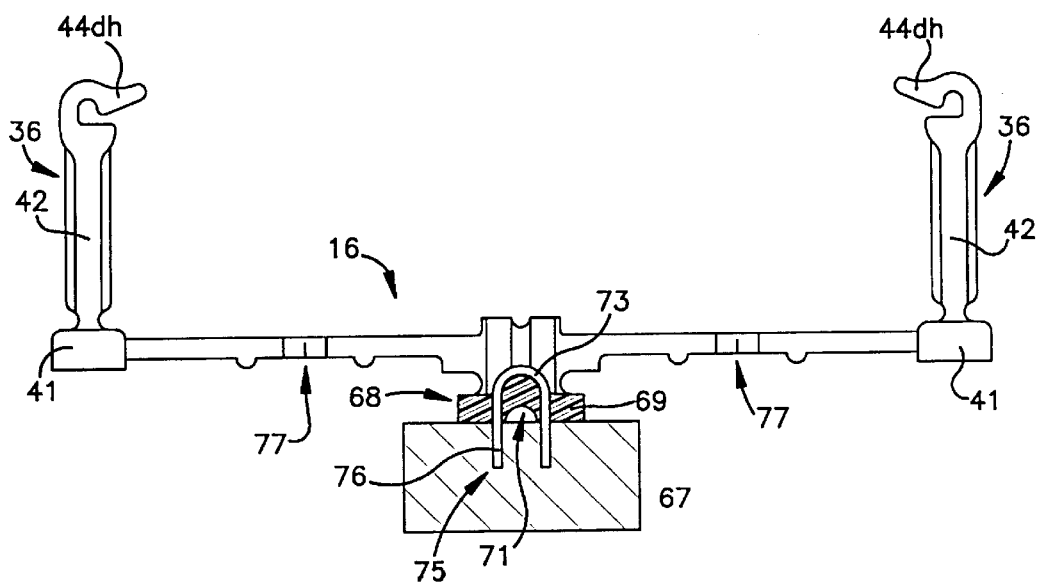
FIG. 9A is a cross-sectional view of a composite material spring module of the type illustrated in FIGS. 8A and 8B attached directly to a frame member of a foundation structure.
Figure 9B:
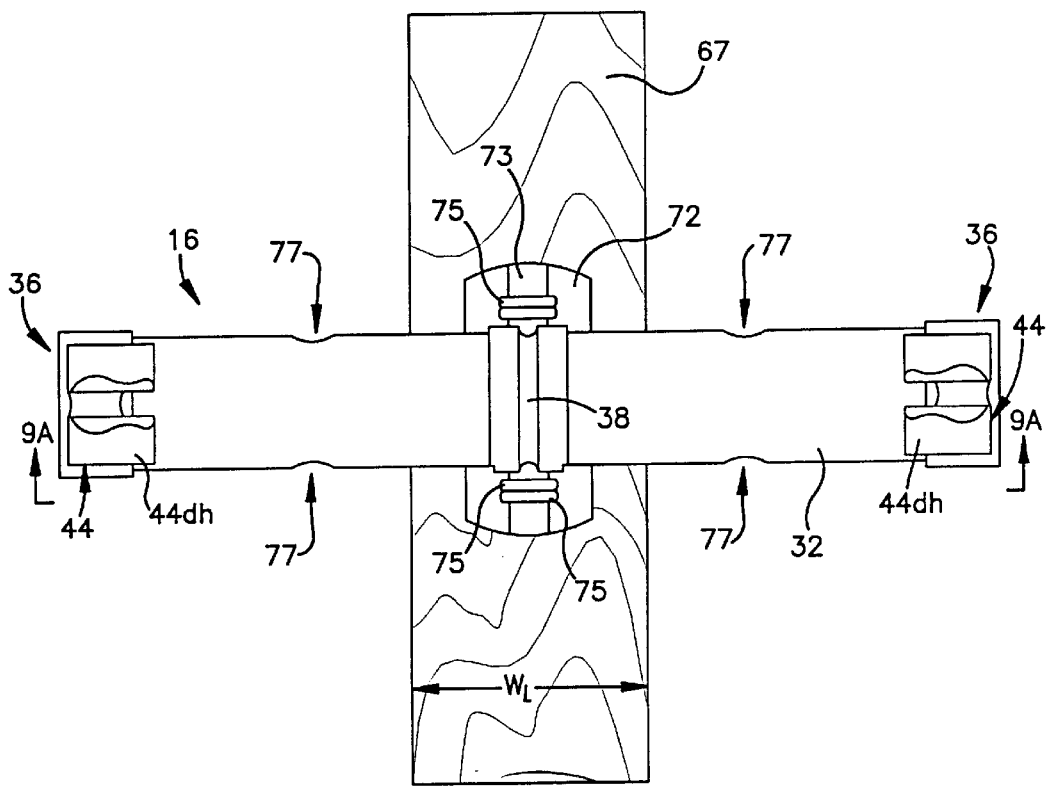
FIG. 9B is a overhead view of a composite material spring module of the type illustrated in FIGS. 8A and 8B attached directly to a frame member of a foundation structure.

Turning now to FIGS. 9A and 9B, the interaction between a composite spring module of the type illustrated in FIGS. 8A and 8B and a planar supporting frame member is disclosed. Base fasteners 75 are suitably used to secure the foot support member 68 directly to the planar surface of the supporting frame member 67. U-shaped staples are used as fasteners in the preferred embodiment, however, nails, bolts, screws, rivets, pins, glue or any other fastener and equivalents such as would occur to one skilled in the art are suitably used. To secure the base 69 to the frame member 67, fasteners, such as U-shaped staples 75, are suitably driven through the top surface 72 of the base 69, through base 69, and into the frame support member 67. The indexing ridge 73 is preferably designed to accept the U-shaped staple 75 such that the curved portion of the staple 75 suitably makes flush contact with the ridge 73 and the prongs 76 of the staple 75 suitably straddle the indexing ridge 73. The indexing ridge 73, therefore, preferably acts as a guide for the placement of staples 75. When staples are driven through the base 69, the tines 76 of the staple 75 are located on opposing sides of the indexing ridge 73. The indexing ridge 73, therefore, ensures that the staples 75 are aligned with each other, as well as with the center of the spring 16 and the lateral center of the foot support member 68. This alignment mechanism facilitates both manual and automated fixation of the foot support member 68 to the frame member 67, as for example by use of a powered staple gun.

Turning now to FIG. 10, an embodiment of single spring module attached to a frame member and engaged with the intersecting wires of an overlying grid is disclosed. Each of the gripping fingers 44 are alternately formed with a radiused head 45 (see FIG. 1B) which extends over channel 46 dimensioned to receive and frictionally engage grid member 26. Similarly, a second channel 47, orthogonal to channel 46, is dimensioned to receive transverse grid member 28. In addition, second radiused heads 48 (see FIG. 1C) are suitably provided and extend over channel 47 to frictionally engage transverse member 28.

On the grid attachment fittings 36 of the spring modules 16, each of the gripping fingers 44 comprises a laterally extending locking tab $44_{dh}$ which is generally aligned with the length of the module body 32 and suitably extends over an interior side opening $46_o$ into channel 46 in which a longitudinal grid member 26 is received in the foundation assembly. The interior side opening $46_o$ allows the longitudinal grid members 26 to easily enter channel $46_o$ and the locking tabs $44_{dh}$, each formed with a downwardly canted underside, guides the grid members 26 through opening $46_o$ into channel 46. Preferably, the height of opening $46_o$ is less than a cross sectional width of member 26, whereby the locking tabs $44_{dh}$ are forced upward as the member 26 passes through opening $46_o$, and then snap down to capture and retain grid members 26 within channel 46.

Like the illustration of FIG. 3B, a transverse grid member 28 preferably comprises horizontal or lateral offsets of a linear extent sufficient to traverse channel formed between gripping fingers 44. The lateral offsets are horizontal in the sense that they extend laterally in a plane defined by the top surface of a grid in which the crosswire 28 is incorporated. By this arrangement, the grid attachment fittings 36 are restricted from movement along the length of transverse grid member 28. In addition, the lateral offsets aid in preventing lateral displacement of the spring module 16 along longitudinal grid members 26. Furthermore, the horizontal lateral offsets are overlapped by a portion of the locking tabs 44, which strengthens the mechanical engagement of the intersecting grid members 26 and 28 within the attachment fittings 36.

In the alternative, the grid attachment fittings 36 and grid wires 26 and 28 are suitably configured as shown in FIG. 3A and described above.

As is shown in FIG. 10, the placement of the foot support member 68 upon the planar surface of frame member 67 is important when positioning the gripping fingers 44 of the grid attachment stanchion fittings 36 at the intersection of wires 26 and 28. As for example in the case where the frame member 67 is a stock piece of hardwood without calibration or markings, it must be matched in the length to the dimensions of the grid 14 to determine the correct location of each of the spring modules 16 to be attached to the frame member 67, prior to engagement of the spring modules 16 with the grid 14.

Turning now to FIGS. 11A–11C, an embodiment of an elevated composite spring module of the present invention is disclosed. The spring module 16 is of the same structure as the spring modules illustrated in FIG. 1A and FIGS. 3A and 3B and described above, but additionally, the frame attachment fitting 34 comprises a spacer 80 residing between and connected to the spring body 32 and the frame attachment neck 39. The spacer 80 is suitably made of any structurally appropriate material, such as plastic or metal, and molded around, bonded, fastened or secured to body 32 and neck 39 at the respective positions. The spacer 80 is also suitably formed of a different plastic material than all other parts of the spring module 16. In the presently preferred embodiment, the spacer 80 is integrally formed to the neck 39 and spring body 32 and made of the same plastic as the rest of the frame attachment fitting 34.

The spacer 80 is suitably rectangular in shape and preferably of the same approximate width as the spring body 32. The vertical members 82 and 86 generally parallel to one another and generally perpendicular to spring body 32. Vertical members 82 and 86 are suitably equal in length to one another and equal to the height dimension of spacer 80. The vertical members 82 and 86 suitably range from ½ inch to 4 inches, and preferably range from 1 inch to 1⅝ inches.

Connected to vertical members 82 and 86 are horizontal members 84 and 88, which are generally perpendicular to vertical members 82 and 86 and generally parallel to spring body 32. The vertical members 82 and 86 and the horizontal members 84 and 88 therefore form a generally rectangular box. On the interior of the rectangular box is a support member 94, which suitably runs generally perpendicular to both vertical members 82 and 86 and horizontal members 84 and 88. Preferably, the support member 94 runs through the center of spacer such that horizontal members 84 and 88 and support member 94 suitably form an I-beam shape. Likewise, vertical members 82 and 86 and support member 94 suitably form an I-beam shape generally ninety degrees offset from the I-beam formed by the support member 94 and the horizontal members 84 and 88. The I-beam shape formed by the horizontal members 84 and 88 and support member 94 provides support for forces exerted on the top of spring module 16, such as those forces that are exerted on a spring module 16 when it is used in a mattress foundation.

The spacer 80 is preferably integrally formed with spring body 32 such that the connection area 92 between the spring body 32 and the spacer 80 has a width that is narrower than the width of the spacer 80. The gap 90 suitably ranges from 1/16 to 3/16 inches, and is preferably approximately 1/8 inch. The decreased width connection area 92 and resulting gap 90 suitably add flexibility to the spacer 80 in that the spring body 32 is capable of flexing relative to the connection area 92.

Figure 12A:
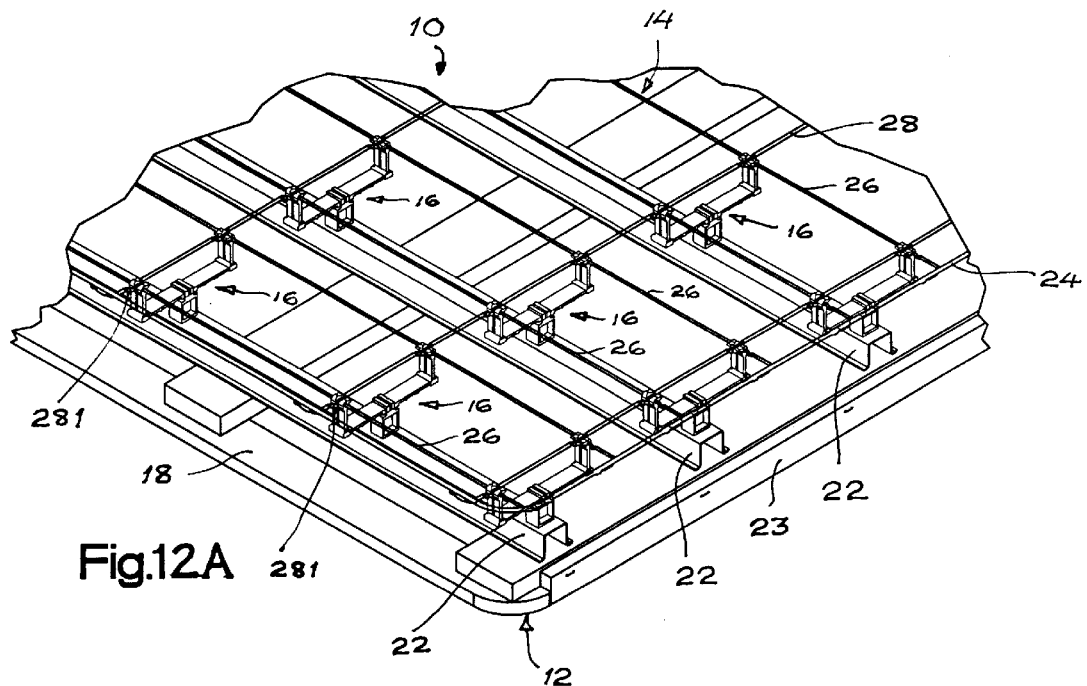
FIG. 12A is a perspective view of a low profile version of a mattress foundation frame with composite material spring modules of the type illustrated in FIGS. 12A–12C.

Turning now to FIG. 12A, an embodiment of a low profile mattress foundation of the invention having a plurality of composite material spring modules of the type illustrated in FIGS. 11A–11C is disclosed. The mattress foundation 10 comprises a novel low profile frame, indicated generally at 12 which supports a plurality of spring modules 16, which are suitably made of composite material and attached to a grid or matrix 14 disposed parallel to and above frame 12. The grid 14 suitably acts as a mattress supporting surface. The frame 12 suitably comprises two longitudinally extending perimeter members 18, and a plurality of intermediate transverse members 21, all of which are suitably constructed of wood, steel or other metals such as aluminum, or other suitable materials such as pultruded or extruded beam-like parts, or blow-molded or structural foam parts. The frame members 18, and 21 are secured together to form a rectilinear frame 12.

In the low profile frame 12 (FIG. 12A) the transverse members 21 are suitably laid flat with a major width $w_t$ parallel to and flush against the major widths $w_p$ of longitudinal members 18 and 19, and the narrow edges e orthogonal to the top surfaces of members 18 and 19. A plurality of longitudinally extending upper longitudinal frame members 22 (which are suitably constructed of wood or steel, or extruded or pultruded plastic such as polyethylene or polypropylene, PVC or fiberglass reinforced plastic) are suitably attached orthogonal to the major widths $w_t$ (top surfaces) of transverse members 21. An end fascia board or strip 23 is suitably attached to each transverse end of the frame, against the outer narrow edge of the transverse perimeter members 21 at the ends of the longitudinal perimeter members 18. A major width $w_f$ of fascia board 23 is thereby perpendicular to the major width $w_t$ of end transverse members 21 and a bottom narrow edge of the fascia board 23 is flush with bottom surfaces of the longitudinal members 18 and 19. The bottom edge of the fascia strip 23 is suitably flush with the bottom surfaces of the perimeter frame members to create a smooth continuous surface for attachment of upholstery. The fascia board 23 suitably extends vertically above the end transverse members 21 to provide a chock against which the ends of upper longitudinal frame members 22 abut. With the upper longitudinal frame members 22 cut to equal length, abutment of the ends against the fascia strips 23 insures that the frame is chocked and square when the members are fastened together. The spring modules 16 are suitably attached to top surfaces of the upper longitudinal frame members 22 as further described below.

Figure 12B:
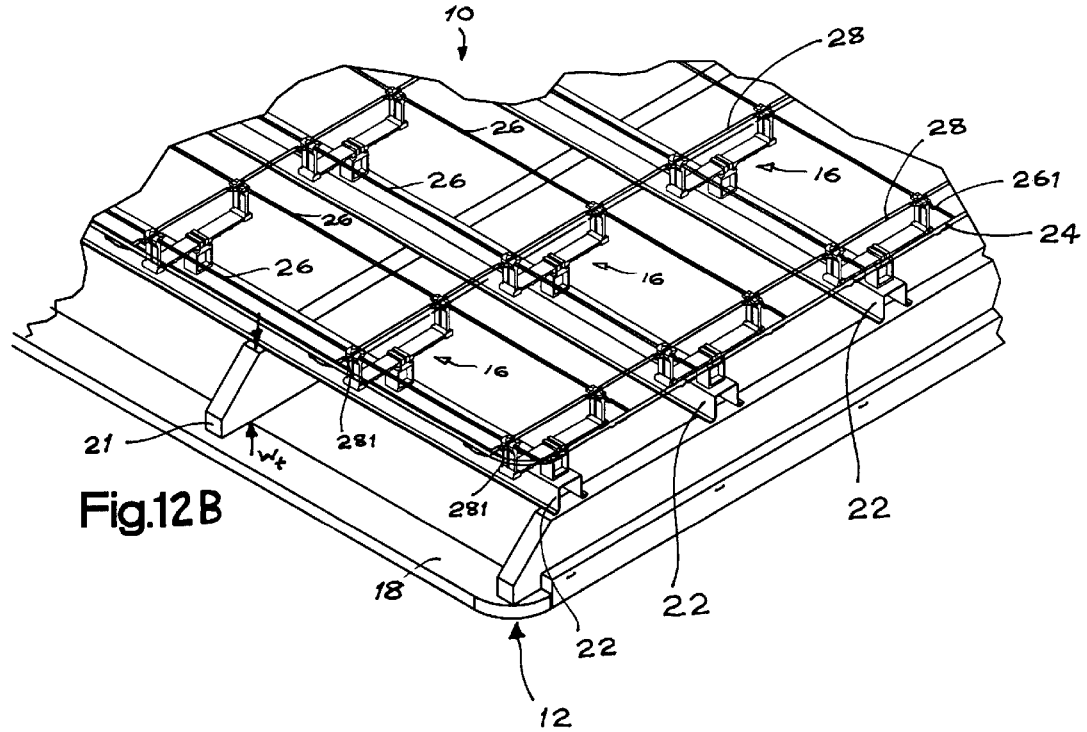
FIG. 12B is a perspective view of a high profile version of a mattress foundation frame with composite material spring modules of the type illustrated in FIGS. 12A–12C.

As shown in FIGS. 12A and 12B, the grid 14 is formed by a peripheral border element 24 (also referred to herein as "borderwire") of generally the same width and length dimensions of frame 12, a plurality of longitudinal elements 26 suitably secured to the borderwire 24 by clips or welds or simply bent or hooked around the borderwire 24, and a plurality of transverse grid elements 28 (also referred to herein as "crosswires") which intersect longitudinal elements 26 to define a generally orthogonal grid 14 which forms a support surface for a mattress. The crosswires are suitably clipped to the grid 14 over frame 12. The transverse elements 28 may be thicker (i.e., heavier gauge or bigger cross-section) than the longitudinal elements 26. The grid 14 (including elements 24, 26 and 28) is suitably constructed of low carbon or high carbon steel, but is alternatively formed of composite material such as fiber reinforced plastic. The fiber reinforced plastic is then suitably connected in an orthogonal matrix or other arrangement such that the plastic elements are bonded or glued, ultrasonically welded, or otherwise fastened. In addition, a grid 14 is suitably or formed as a single integrated structure by plastic or composite material molding processes suitable for relatively large structures such as rotational molding or injection molding. The grid 14 is supported over frame 12 by the plurality of spring modules 16 attached at a bottom point to upper longitudinal frame members 22 and at upper points about the intersection of elements 26 and 28 of grid 14. The longitudinal grid wires 26 have notches 261 located between the border wire 24 and the attachment fitting 36 of the spring module 16 closest to the border wire. Notches 261 serve to maintain the orthogonal alignment of the integrated grid/spring structure. In addition, the transverse elements 28 suitably comprise notches 281 between borderwire 24 and the spring module 16 closest to borderwire 24 for preventing the spring modules 16 from migrating toward borderwire 24. The notches 281 may be either vertically or horizontally offset relative to the plane in which the grid lies.

Turning now to FIG. 12B, an illustration of an embodiment of a higher profile foundation of the current invention having a plurality of composite material spring modules of the type illustrated in FIGS. 11A–11C is disclosed. The foundation 10 suitably has a high profile frame, indicated generally at 25, wherein the transverse frame members 21 are oriented with a major width $w_t$ oriented vertically to achieve a greater height dimension and elevates the longitudinal frame members 22 (and spring modules 16) mounted on narrow edge e. In other words, the perimeter members 18 are flat, while the transverse members 21 are upright. The narrow bottom edges e of the transverse members 21 rest upon the top surfaces or major widths $w_p$ of the longitudinal perimeter frame members 18 and central longitudinal member 19. The upper longitudinal frame members 22 are attached to the narrow top edges e of the transverse members 21. End fascia strips 23 are similarly vertically oriented along the side of the end transverse members 21, with a major width $w_f$ oriented vertically, perpendicular to the major widths $w_p$ of the longitudinal members, and the narrow bottom edges of the transverse members flush with the bottom of the longitudinal perimeter frame members 18. This construction provides a very stiff frame with the transverse ends reinforced by side-by-side vertically oriented double board thickness. Of course, the rigidity of the transverse members 21 is optimized by loading upon the narrow edges e, on which the longitudinal frame members 22 rest.

Additional frame members are suitably used to achieve even greater heights and stiffness. Alternatively, the length of upright members 42 of the grid attachment fittings 36 are suitably designed to produce any reasonable desired height of the grid 14 over the spring modules. Furthermore, altering the lengths of vertical members 82 and 86 suitably increases or decreases the height dimension of the foundation. Either increasing or decreasing the height dimension of the upper longitudinal frame members 22 also suitably alters the height of the foundation.

Figure 13:
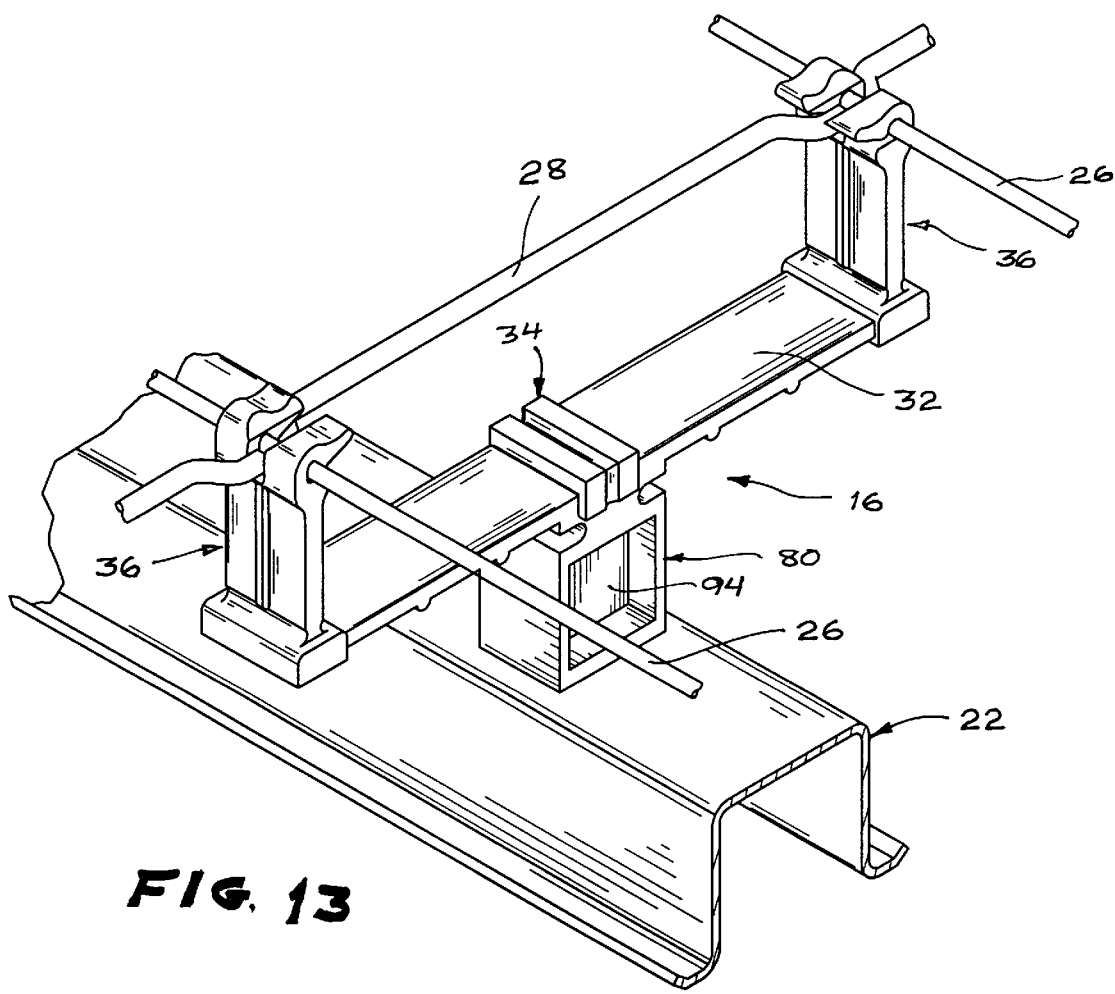
FIG. 13 is a perspective view of a raised composite material spring module of FIGS. 12A–12C engaged with a frame member and a grid in a mattress foundation of the present invention.
Figure 14D:
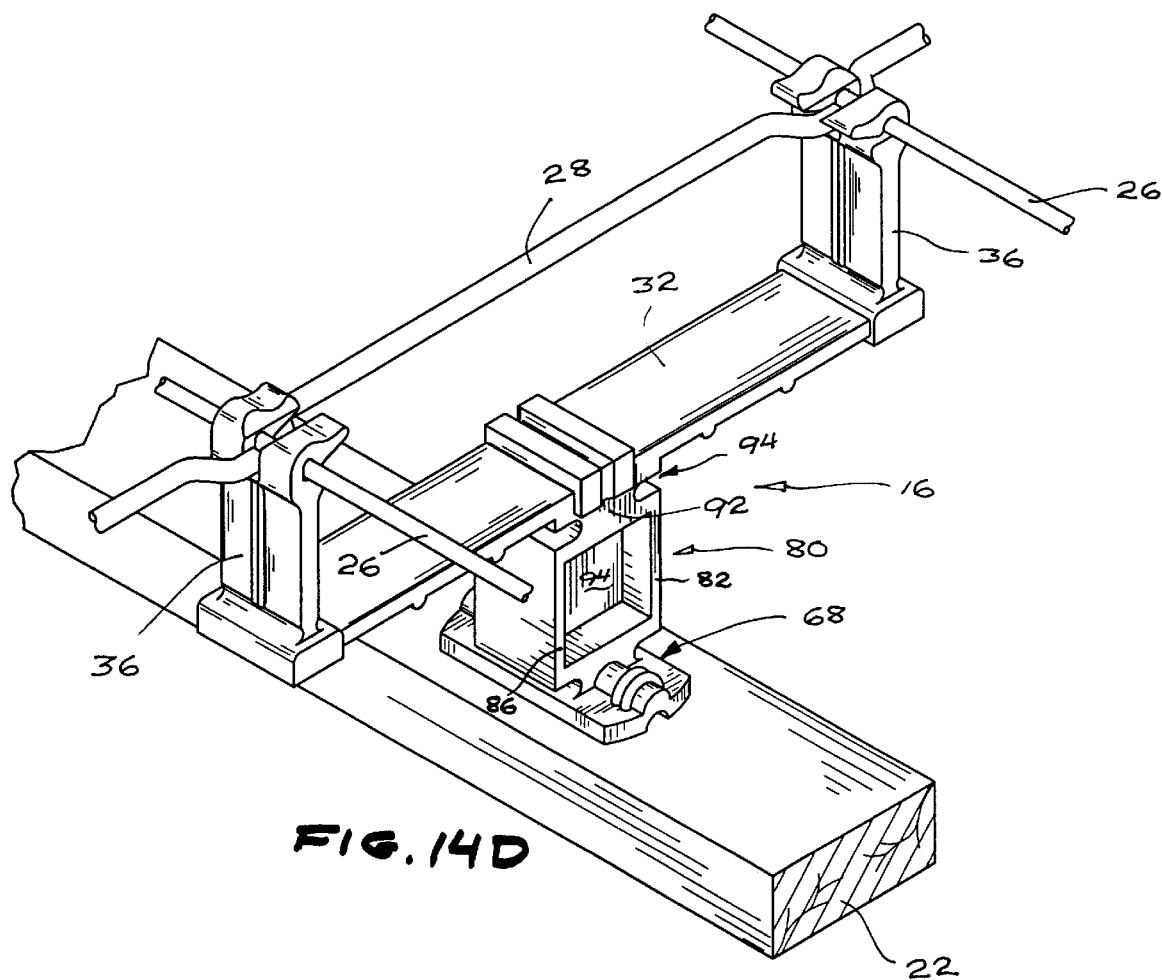
FIG. 14D is a bottom perspective view of the raised composite spring module of FIG. 14A.

Turning now to FIG. 13, an embodiment of single spring module of the type illustrated in FIGS. 11A–11C attached to a frame member and engaged with the intersecting wires of an overlying grid is disclosed. The interaction of the frame attachment fitting 34 of the spring 16 with an upper longitudinal frame member 22 as illustrated in FIGS. 3A and 3B and described with reference thereto. Alternatively, the frame attachment fitting 34 suitably interacts with an upper longitudinal frame member 22 as illustrated in FIGS. 6B and 6C and described above. Likewise, the grid attachment fittings 36 suitably interact with grid 14 as illustrated in FIG. 3B and described above. Alternatively, the grid attachment fittings 36 suitably interact with grid 14 as illustrated in FIG. 3A and described above.

Turning now to FIGS. 14A–14D, an alternate embodiment is shown of a raised composite material spring module 16 which has a frame attachment fitting 34 with a foot support member 68 configured for direct mounting and engagement with a planar surface, such as a frame member. The spring module 16 is of the same structure as the spring modules illustrated in FIGS. 8A and 8B and described above, but additionally, the frame attachment fitting 34 has a spacer 80 residing between and connected to the spring body 32 and the foot support member 68. The spacer 80 is suitably made of any structurally appropriate material, such as plastic or metal, and molded around, bonded, fastened or secured to body 32 and foot support member 68 at the respective positions. The spacer 80 is also suitably formed of a different plastic material than all other parts of the spring module 16. In the presently preferred embodiment, the spacer 80 is integrally formed to the foot support member 68 and spring body 32 and made of the same plastic as the rest of the frame attachment fitting 34.

The spacer 80 is suitably rectangular in shape and preferably of the same approximate width as the spring body 32. The vertical members 82 and 86 are generally parallel to one another and generally perpendicular to spring body 32. Vertical members 82 and 86 are suitably equal in length to one another and equal to the height dimension of spacer 80. The vertical members 82 and 86 suitably range from ½ inch to 4 inches, and preferably range from 1 inch to 1⅝ inches. Connected to vertical members 82 and 86 are horizontal members 84 and 88, which are generally perpendicular to vertical members 82 and 86 and generally parallel to spring body 32. The vertical members 82 and 86 and the horizontal members 84 and 88 therefore form a generally rectangular box. On the interior of the rectangular box is a support member 94, which suitably runs generally perpendicular to both vertical members 82 and 86 and horizontal members 84 and 88. Preferably, the support member 94 runs through the center of spacer such that horizontal members 84 and 88 and support member 94 suitably form an I-beam shape. Likewise, vertical members 82 and 86 and support member 94 suitably form an I-beam shape generally ninety degrees offset from the I-beam formed by the support member 94 and the horizontal members 84 and 88. The I-beam shape formed by the horizontal members 84 and 88 and support member 94 provides support for forces exerted on the top of spring module 16, such as those forces that are exerted on a spring module 16 when it is used in a mattress foundation.

The spacer 80 is preferably integrally formed with spring body 32 such that the connection area 92 between the spring body 32 and the spacer 80 has a width that is narrower than the width of the spacer 80. Connecting the foot support member 68 in such manner creates a gap 90 between the spacer 80 and spring body 32 on each side of the connection area therebetween. The gap 90 suitably ranges from 1/16 to 3/16 inches, and is preferably approximately 1/8 inch. The decreased width connection area 92 and resulting gap 90 suitably add flexibility to the spacer 80 in that the spring body 32 is capable of pivoting about the connection area 92. Likewise, the spacer 80 is preferably integrally formed with foot support member 68 such that the connection area 94 between the foot support member 68 and the spacer 80 has a width that is narrower than the width of the spacer 80. Connecting the foot support member 68 in such manner creates a gap 94 between the spacer 80 and foot support member 68 on each side of the connection area therebetween. The gap 94 also suitably ranges from 1/16 to 3/16 inches, and is preferably approximately 1/8 inch. The decreased width connection area 96 and resulting gap 94 suitably add flexibility to the spacer 80 in that the foot support member 68 is capable of pivoting about the connection area 96.

Figure 15A:
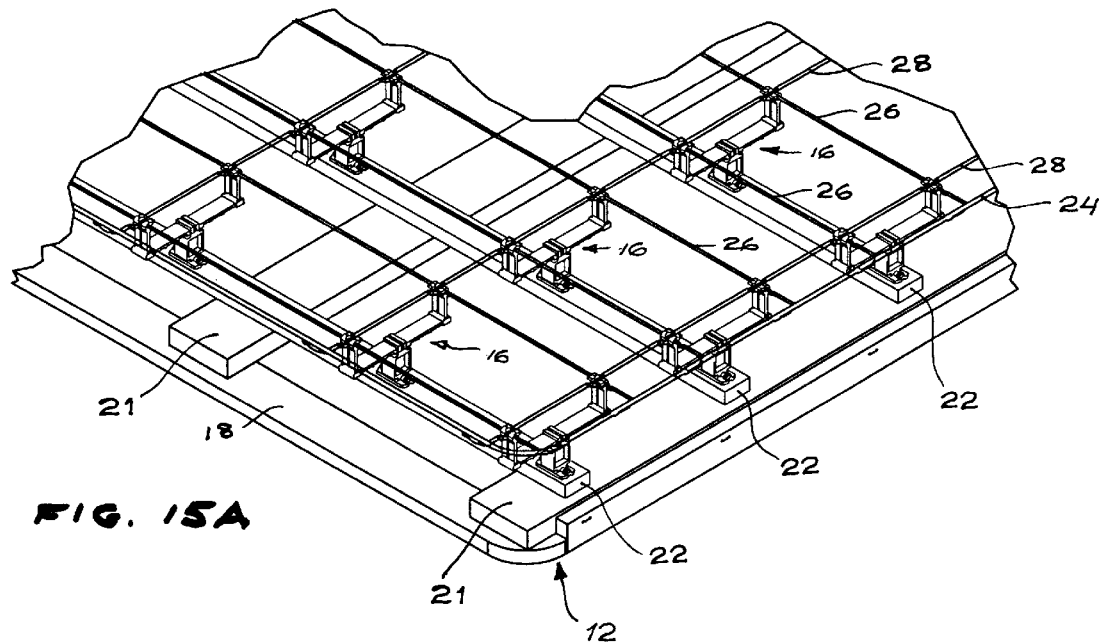
FIG. 15A is a perspective view of a low profile version of a mattress foundation frame with composite material spring modules of the type illustrated in FIGS. 14A–14C.

Turning now to FIG. 15A, an embodiment of a low profile mattress foundation of the invention having a plurality of composite material spring modules of the type illustrated in FIGS. 14A–14C is disclosed, wherein the integral foot member 68 is mounted directly onto the planar surfaces of frame members 22 of a spring support structure, such as a furniture or mattress box spring frame.

Figure 15B:
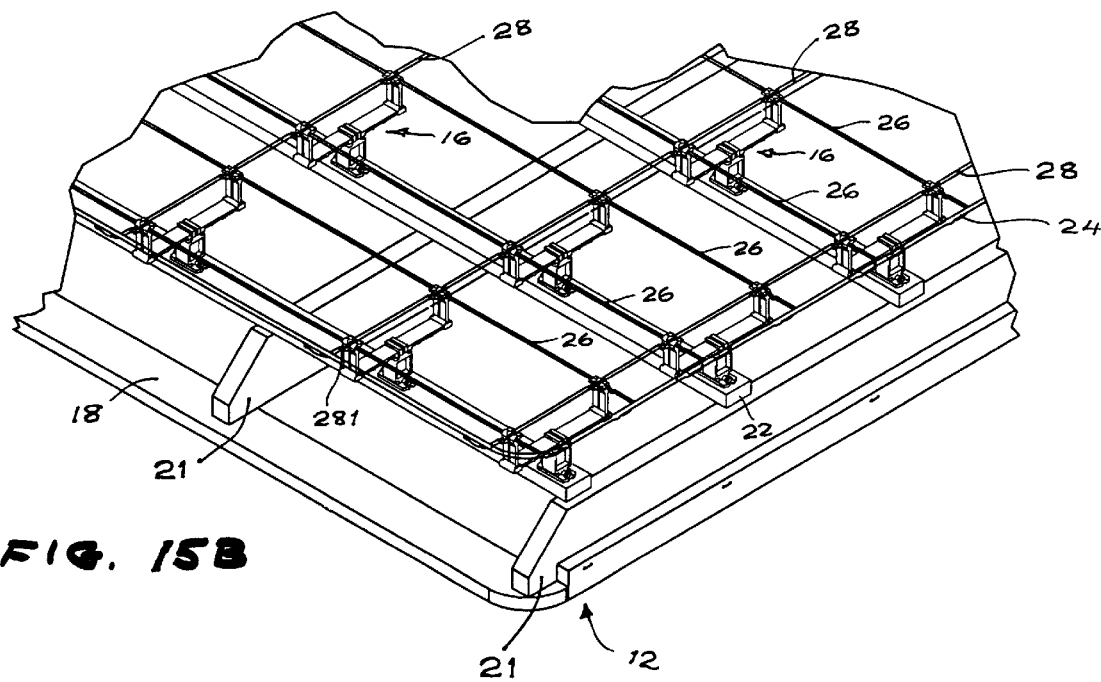
FIG. 15B is a perspective view of a high profile version of a mattress foundation frame with composite material spring modules of the type illustrated in FIGS. 14A–14C.

Turning now to FIG. 15B, an embodiment of a high profile mattress foundation of the invention having a plurality of composite material spring modules of the type illustrated in FIGS. 14A–14C is disclosed.

Although the preferred and alternate embodiments have been described in detail, it should be understood that various changes, substitutions and alterations are suitably made therein without departing from the spirit and scope of the invention as defined by the appended claims.

For example, the spacer 80, which accomplishes the elevation of the spring body 32 above the underlying frame member, may be integrally formed with the outer shell of the composite spring which also forms the grid and frame attachment fittings, or it can be provided as a separate component which is assembled or retro-fitted on to the spring/frame assembly. Also, the form of the spacer 80 may vary from the described I-beam configuration, such as for example a solid block or cylindrical or wire form, which are just a few examples of equivalent structures which would perform the same elevation function. All such variations and modifications are within the conceptual scope of the invention as defined by the claims, and equivalents thereto.

What is claimed is:

1. A spring module comprising:
   a) a spring body made of composite material including a first plastic material and a fiber; and
   b) a second plastic material overlaying at least a portion of the spring body;
   c) attachment fittings made of at least one plastic material, the attachment fittings comprising:
      grid attachment fittings configured for attachment to an overlying grid, and
      at least one frame attachment fitting spaced apart from the spring body by a spacer and configured for indexed engagement with an underlying frame member.

2. The composite material spring module of claim 1 wherein at least one of the attachment fittings is integrally formed about the spring body.

3. The composite material spring module of claim 1 wherein the attachment fittings are formed of a material different than the first plastic material and the second plastic material.

4. The composite material spring module of claim 1 wherein the spacer is formed of a material different than the first plastic material and the second plastic material.

5. The composite material spring module of claim 1 wherein the plastic of the spring body is a vinyl ester and the fiber of the spring body is fiberglass.

6. The composite material spring module of claim 1 wherein the fiber of the spring body is oriented to extend generally along a length of the spring body.

7. The composite material spring module of claim 1 wherein the fiber of the spring body extends substantially the entire length of the spring body.

8. The composite material spring module of claim 1 wherein the fiber of the spring body includes a plurality of fiber strands.

9. The composite material spring module of claim 1 wherein the fiber of the spring body includes a plurality of fibers of length generally shorter than a length of the spring body.

10. The composite material spring module of claim 6 wherein the fibers are randomly arranged within the plastic of the spring body.

11. The composite material spring module of claim 1 wherein the attachment fittings are formed of a plastic different than the plastic of the spring body.

12. The composite material spring module of claim 8 wherein the plastic of the attachment fittings is selected from a group consisting of polypropylene, polyethylene, nylon and ABS.

13. The composite material spring module of claim 1 wherein the spring body is generally planar.

14. The composite material spring module of claim 1 wherein the grid attachment fittings comprise gripping elements configured for lateral engagement with an overlying grid.

15. The composite material spring module of claim 12 wherein the gripping elements of the grid attachment fittings are configured to frictionally engage elements of an overlying grid.

16. The composite material spring module of claim 12 wherein the gripping elements of the grid attachment fittings are spaced apart to define channels wherein elements of a structure supported by the spring modules are received.

17. The composite material spring module of claim 12 wherein the gripping elements comprise radiused heads which frictionally engage elements to which the grid attachment fittings attach.

18. The composite material spring module of claim 1 wherein the grid attachment fittings have top openings through which elements can be inserted into the grid attachment fittings.

19. The composite material spring module of claim 1 wherein the grid attachment fittings have internal cavities and side openings adjacent to the internal cavities through which elements can be inserted into the grid attachment fittings.

20. The composite spring module of claim 18 wherein the spring body is generally linear and oriented generally parallel to the frame and the grid when attached to the frame and to the grid.

21. The composite spring module of claim 18 wherein the frame attachment fitting is formed on one side of the spring body and the grid attachment fittings are formed on an opposite side of the spring body.

22. The composite spring module of claim 18 wherein the attachment fittings are molded from a plastic different than the plastic of the spring body.

23. The composite spring module of claim 18 wherein the grid attachment fittings are configured for interlocking engagement with the frame and the grid of the mattress foundation.

24. The composite spring module of claim 18 wherein the attachment fittings are flexible relative to the spring body.

25. The composite spring module of claim 18 wherein the spring body comprises multiple fibers which extend substantially an entire length of the spring body.

26. The composite spring module of claim 18 wherein the spring body comprises multiple fibers of generally random orientation within the spring body.

27. The composite spring module of claim 18 wherein at least one of the grid attachment fittings comprise a flexible hinge, whereby the grid attachment fitting can move in response to movement of the grid or spring body.

28. The composite spring module of claim 18 wherein the frame attachment fitting comprises a neck and a key configured for locking engagement with a frame element of the mattress foundation frame.

29. The composite spring module of claim 18 wherein the grid attachment fitting comprises gripping fingers configured for locking engagement with the grid of the mattress foundation.

30. The composite material spring module of claim 1, further comprising an indexing groove configured to receive a fastener.

31. The composite material spring module of claim 1 wherein the frame attachment fitting is a key configured for engagement with a hole in an underlying frame member.

32. The composite material spring module of claim 31 wherein the key has a length dimension generally greater than a width dimension.

33. The composite material spring module of claim 31 wherein the key has a length generally aligned with the length of the spring body.

34. The composite material spring module of claim 31 wherein the key has a length generally perpendicular to the length of the spring body.

35. A single piece composite material spring module for use in a mattress foundation having a frame and a grid, the spring module configured for attachment to an underlying frame and to an overlying grid, the spring module comprising:
  a) a spring body made of composite material including a first plastic material and a fiber; and
  b) a second plastic material overlaying at least a portion of the spring body;
  c) attachment fittings made of at least one plastic material, the attachment fittings comprising:
    grid attachment fittings configured for attachment to the overlying grid, and
    at least one frame attachment fitting spaced apart from the spring body by a spacer and configured for indexed engagement with the underlying frame member.

36. A composite material mattress foundation comprising:
  a) a foundation frame having interconnected perimeter, transverse and longitudinal members;
  b) a grid generally parallel to and spaced from the foundation frame;
  c) a plurality of composite material spring modules between the foundation frame and the grid, each spring module comprising:
    i) a spring body made of composite material including a first plastic material and a fiber; and
    ii) a second plastic material overlaying at least a portion of the spring body;
    iii) attachment fittings made of at least one plastic material, the attachment fittings comprising:
      grid attachment fittings configured for attachment to the grid, and
      at least one frame attachment fitting spaced apart from the spring body by a spacer and configured for indexed engagement with a frame member.

37. The composite material mattress foundation of claim 36 wherein each of the spring modules comprise substantially continuous fibers which extend substantially an entire length of the body of the spring module.

38. The composite material mattress foundation of claim 36 wherein each of the spring modules comprise an array of fibers in the spring body.

39. The composite material mattress foundation of claim 36 wherein the attachment fittings of the spring modules are formed of a plastic material different than a plastic material of the spring body.

40. The composite material mattress foundation of claim 36 wherein the frame attachment fitting of the spring modules comprises a key and a neck which extends from the spring body.

41. The composite material mattress foundation of claim 36 wherein the grid attachment fitting of the spring modules comprises gripping fingers configured to grip the grid.

42. The composite material mattress foundation of claim 41 wherein the attachment fittings of the spring modules comprise a flexible hinge spaced from the gripping fingers.

43. The composite material mattress foundation of claim 39 wherein the plastic material which forms the attachment fittings of the spring modules covers substantially the entire spring body.

44. The composite material mattress foundation of claim 39 wherein the plastic material which forms the attachment fittings of the spring modules surrounds only a portion of the spring body.

45. The composite material mattress of claim 36 wherein the grid is formed of composite material.

46. A single piece composite material spring module comprising:
  a spring body made of composite material including a first plastic material and a fiber; and
  a second plastic material integrally formed about at least a portion of the spring body;
  attachment fittings made of at least one plastic material and integrally formed about the spring body, the attachment fittings comprising:
    grid attachment fittings configured for attachment to an overlying grid, and
    at least one frame attachment fitting spaced apart from the spring body by a spacer and configured for indexed engagement with an underlying frame member;

wherein the composite material spring is formed by the process of:
  encapsulating a plurality of fibers within a first plastic material to form a composite material spring body with encapsulated fibers,
  inserting the composite material spring body into a mold having mold cavities in the form of grid attachment fittings and a frame attachment fitting, the frame attachment fitting being spaced apart from the spring body by a spacer, and
  integrally forming about the spring body with a moldable material by injecting the mold cavity with the moldable material.

47. A spring module comprising:
a) a spring body made of composite material including a first plastic material and a fiber; and
b) a second plastic material overlaying at least a portion of the spring body;
c) attachment fittings made of at least one plastic material, the attachment fittings comprising:
  grid attachment fittings configured for attachment to an overlying grid, and
  frame attachment fitting comprising a mounting foot spaced apart from the spring body by a spacer and configured for direct attachment to a frame member by a fastener.

48. A composite material mattress foundation comprising:
a) a foundation frame having interconnected perimeter, transverse and longitudinal members;
b) a grid generally parallel to and spaced from the foundation frame; and
c) a plurality of composite material spring modules between the foundation frame and the grid, each spring module comprising:
  i) a spring body made of composite material including a first plastic material and a fiber; and
  ii) a second plastic material overlaying at least a portion of the spring body; and
  iii) attachment fittings made of at least one plastic material, the attachment fittings comprising:
    grid attachment fittings configured for attachment to an overlying grid, and
    frame attachment fitting comprising a mounting foot spaced apart from the spring body by a spacer and configured for direct attachment to a frame member by a fastener.

* * * * *